United States Patent [19]
Bergstrom et al.

[11] Patent Number: 5,521,977
[45] Date of Patent: May 28, 1996

[54] HIGH DENSITY TELEPHONE NETWORK INTERFACE UNIT

[75] Inventors: Eric P. Bergstrom, St. Charles; Richard A. Yndestad, Naperville; John A. Washburn, Aurora, all of Ill.

[73] Assignee: Teltrend Inc., St. Charles, Ill.

[21] Appl. No.: 145,771

[22] Filed: Oct. 29, 1993

[51] Int. Cl.$^6$ .................................................. H04M 19/00
[52] U.S. Cl. ........................... 379/399; 379/324; 379/413
[58] Field of Search ..................................... 379/399, 412, 379/406, 600, 413, 324, 252, 253, 254

[56] References Cited

U.S. PATENT DOCUMENTS

| | | | |
|---|---|---|---|
| 5,026,291 | 6/1991 | David | 439/67 |
| 5,315,644 | 5/1994 | Lester et al. | 379/399 X |
| 5,323,461 | 6/1994 | Rosenbaum et al. | 379/399 |

*Primary Examiner*—Jeffery Hofsass
*Assistant Examiner*—Jacques M. Saint-Surin
*Attorney, Agent, or Firm*—Banner & Allegretti, Ltd.

[57] ABSTRACT

An improved network interface unit having a substantially smaller width than many prior art network interface units. The network interface unit comprises a single, planar circuit board assembly interconnected between incoming and outgoing telephone lines and incoming and outgoing customer premises lines. Two relays and a controller are mounted on the board. The controller monitors the transmission of data along the lines and, by activating the relays, provides communication and maintenance functions, such as loopback. The network interface unit utilizes a controller made up of (1) a processor-based software control system and (2) an integrally cooperating application specific integrated circuit. The controller may, for example, provide and monitor framing, detect and monitor signals, and convert bipolar data to unipolar data.

8 Claims, 9 Drawing Sheets

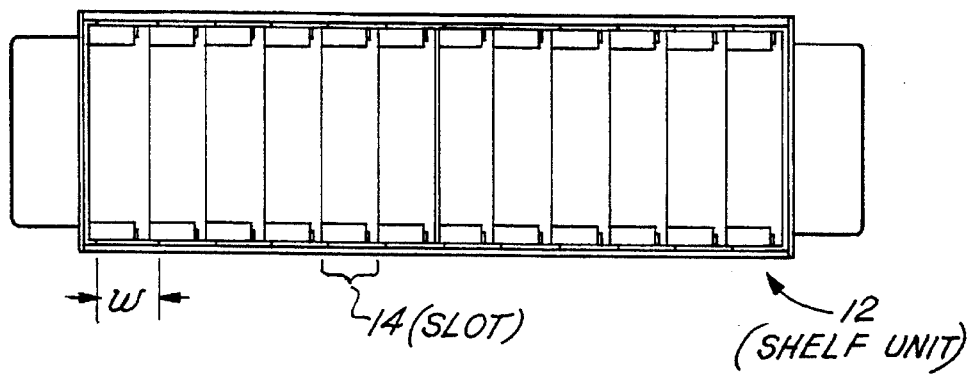
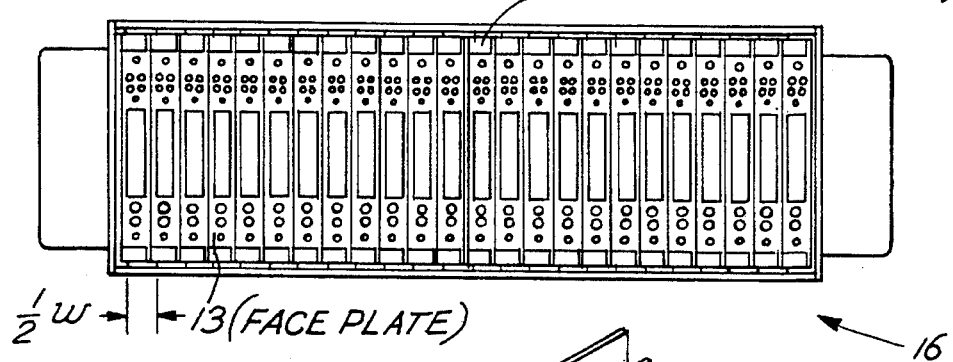
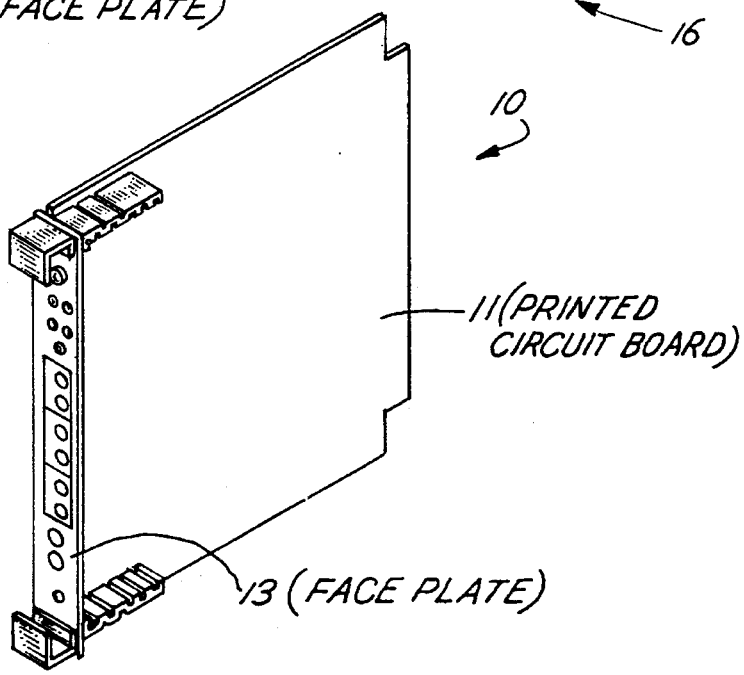

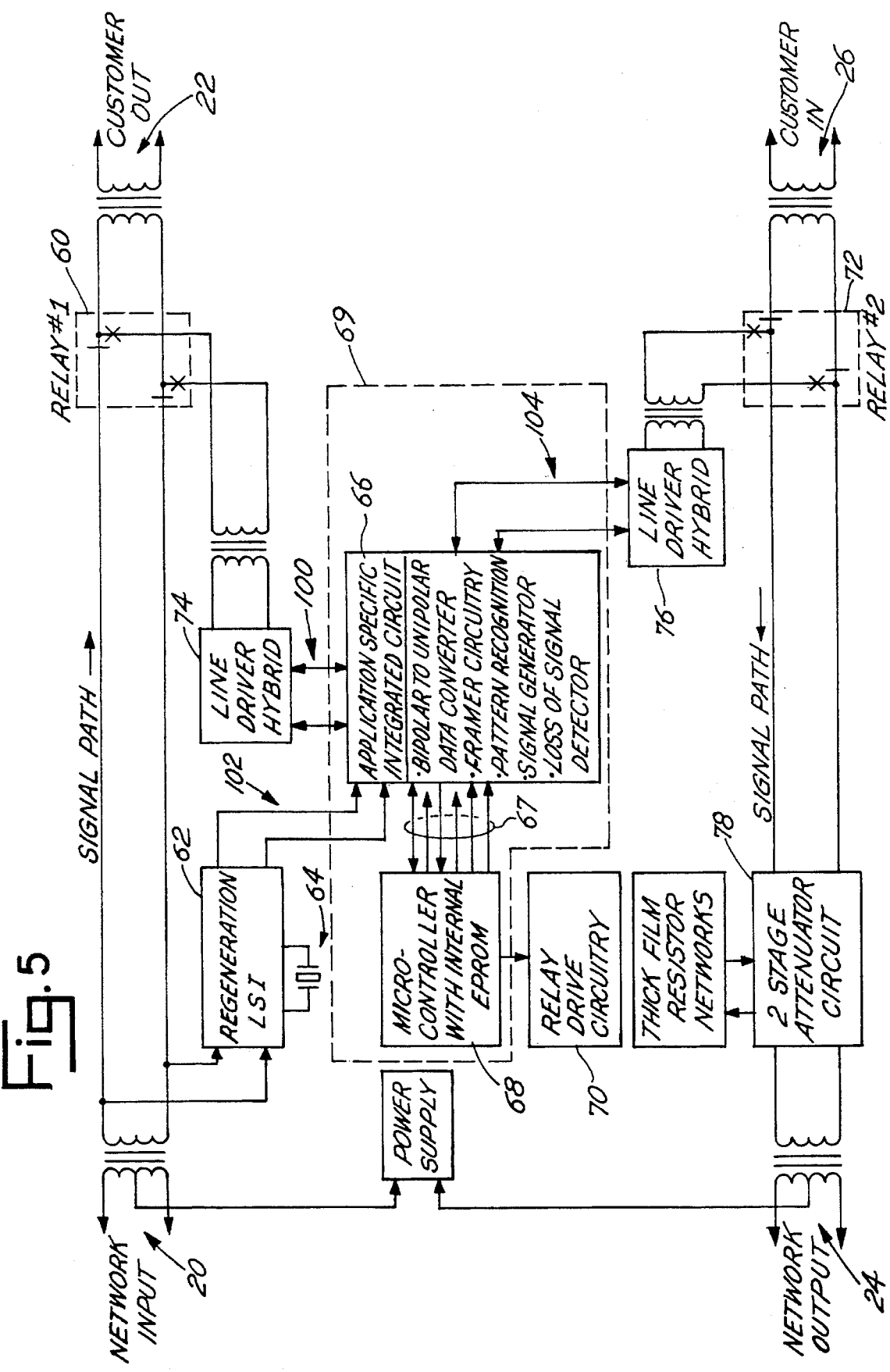

HIGH DENSITY TELEPHONE NETWORK INTERFACE UNIT

COPYRIGHT

A portion of this disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to telecommunication networks and, more particularly, to an improved high density digital network interface unit of reduced size, capable of communicating with remote transmission facilities.

Many telecommunication networks include a central office from which data, or "payload," signals may be transmitted over transmission lines to customer equipment on a customer's premises. Payload signals may comprise encoded analog or digital data.

Digital payload signals are typically sent over the transmission lines to a network interface unit ("NIU"). The NIU is located on the network side of the network interface, which is the point of demarcation between the local exchange carrier ("LEC") and the customer installation ("CI"). Where, for instance, the LEC is a local telephone company, the NIU would demarcate the point along the transmission lines where the telephone company's side of the telephone lines meets the customer's side of the telephone lines.

Electrically, the NIU is generally transparent to payload signals. However, NIU's have traditionally been used to provide special maintenance functions such as signal loopback. Signal loopback enhances carder maintenance operation by allowing the LEC, such as the local telephone company, to remotely sectionalize problems along the transmission lines.

A channel bank receives signals from the NIU and converts the payload from digital signals to analog signals. The channel bank transmits an analog signal for each channel differentially on two wire conductors known as a Tip-Ring pair.

The Bell telephone system in the United States, for example, has widely utilized a digital time-domain multiplexing pulse code modulation system known as the T-1 transmission system. In the T-1 system, the data to be transmitted over the lines, such as speech, may be sampled at a rate of 8,000 hertz, and the amplitude of each sample is measured. The amplitude of each sample is compared to a scale of discrete values and assigned a numeric value. Each discrete value is then encoded into binary form. Representative binary pulses appear on the transmission lines.

The binary form of each sample pulse consists of a combination of seven pulses, or bits. An eighth bit is added to the end of the combination, or byte, to allow for signaling.

Repetitively, each of the twenty-four channels on the T-1 system is sampled within a 125 microsecond period (equivalent to $1/8,000$) of a second). This period is called a "frame." Since there are eight bits per channel and there are twenty-four channels, and there is one pulse at the end of each frame, the total number of "bits" needed per frame is 193. Thus, the resulting line bit rate for T-1 systems is 1.544 million bits per second.

Each frame of digital data is typically delimited by a "frame bit" (or "framing bit") or a series of frame bits. A frame bit serves as a flag, enabling line elements to distinguish the frame from the preceding frame or from noise on the line. In most framing protocols, whenever a receiving station detects the predetermined frame bit pattern, synchronization has been achieved. If the frame bit does not occur in its proper position in the data stream, frame loss has occurred and synchronization with the transmitting end has been lost.

In the T-1 protocol, a coding system is used to convert analog signals to digital signals. The coding system guarantees some desired properties of the signal, regardless of the pattern to be transmitted. The most prevalent code in the United States is bipolar coding with an all zero limitation (also called alternative mark inversion, or "AMI").

In bipolar coding, alternate one's (high bits) are transmitted as alternating positive and negative pulses, assuring a direct current balance and avoiding base-line wander. Contrasted with bipolar coding is unipolar coding, in which every occurrence of a high bit is seen as a positive pulse. In any coding scheme, a violation of predetermined coding rules generally constitutes an error.

Each T-1 transmission system carries 24 8-kB/second voice or data channels on two pairs of exchange grade cables. One pair of cables is provided for each direction of transmission. The T-1 transmission system is used in multiples "N", providing "N"-times-24 channels on "N"-times-two times-two cable pairs. The cables exist in sections, called "spans," between and beyond a series of regenerative repeaters. A channel bank at each end of a span interfaces with both directions of transmission. Incoming analog signals are thus time-division multiplexed, digitized and transmitted. When the digital signal is received at the other end of the line, the incoming digital signal is decoded into an analog signal, demultiplexed and filtered in order to reconstruct the original signal.

Payload signals are received by the telephone company and are transmitted, via the first span of transmission lines, to a series of regenerative repeaters separated by spans of transmission line. Regenerative repeaters are typically spaced every 6000 feet, connected by span lines. Each repeater receives data from the previous repeater or from the central office, but, because of transmission line losses, noise, interference and distortion, the signal will have degenerated. The repeater recognizes the presence or absence of a pulse at a particular point in time and, if appropriate, it regenerates, or "builds up," a clean new signal. The repeater then sends the regenerated signal along the next span of transmission line to the next repeater, stationed approximately one mile away.

The repeaters and span lines continue until the lines extend to the NIU. From the NIU, customer connections continue into customer premises.

In a T-1 transmission system, each span requires an NIU, and multiple spans are typically routed together. Therefore, multiple NIU's are usually placed together in the same physical location. Typically, network interface units are grouped together and mounted in a shelf, such as the Teltrend Rack-Mount Digital Shelf Assemblies Models DSA-120/A and DSA-111/A.

The telecommunications industry provides a standard for the dimensions of the above-discussed network interface units, the units often being referred to as "Type-400."

According to the standard, a Type-400 NIU module is approximately 5.6 inches high, 5.9 inches long, and 1.4 inches wide. Accordingly, the telecommunications industry has also promulgated standards for the dimensions of a Type-400 mounting assembly (or shelf). According to the standard, each slot in an NIU mounting assembly is approximately 1.4 inches wide.

When additional customer interfaces or transmission lines are added to a network, it often becomes necessary to add additional network interface units in order to provide the required additional communication service. Unfortunately, the addition of Type 400 NIU modules has to date required additional shelf space. A need therefore exists for a digital network interface unit that will conserve existing shelf space while efficiently providing useful maintenance functions.

SUMMARY OF THE INVENTION

In a principal aspect, the present invention is an improved network interface unit having a substantially narrower width than existing network interface units, and, accordingly making more efficient use of shelf space. More particularly, the present invention provides a network interface unit comprising a single, planar circuit board assembly interconnected between incoming and outgoing telephone lines and incoming and outgoing customer premises lines. Two relays and a controller are mounted on the board. The controller monitors the transmission of data along the lines and, by activating the relays, provides communication and maintenance functions, such as loopback. The present invention utilizes a controller, made up of (1) a processor-based software control system and (2) an integrally cooperating application specific integrated circuit. The controller may, for example, provide and monitor framing, detect and monitor signals, and convert bipolar data to unipolar data.

Thus, an object of the present invention is a higher density network interface unit. A further object is a more compact network interface unit, substantially mounted on single, planar circuit board assembly, that allows a greater number of network interface units to be more easily housed in a shelf unit, or cabinet, of a particular size. These and other objects, features, and advantages of the present invention are discussed or apparent in the following detailed description.

BRIEF DESCRIPTION OF THE DRAWINGS

A preferred embodiment of the present invention is described herein with reference to the drawing wherein:

FIG. 1 is front view of a shelf unit for containing prior art network interface units;

FIG. 2 is a front view of a shelf unit for containing network interface units made in accordance with the present invention;

FIG. 4 is perspective view of a printed circuit board assembly embodying a network interface unit made in accordance with the present invention;

FIG. 5 is a block diagram of a network interface unit made in accordance with the present invention;

DETAILED DESCRIPTION OF THE PREFERRED EMBODIMENT

Figure 3:
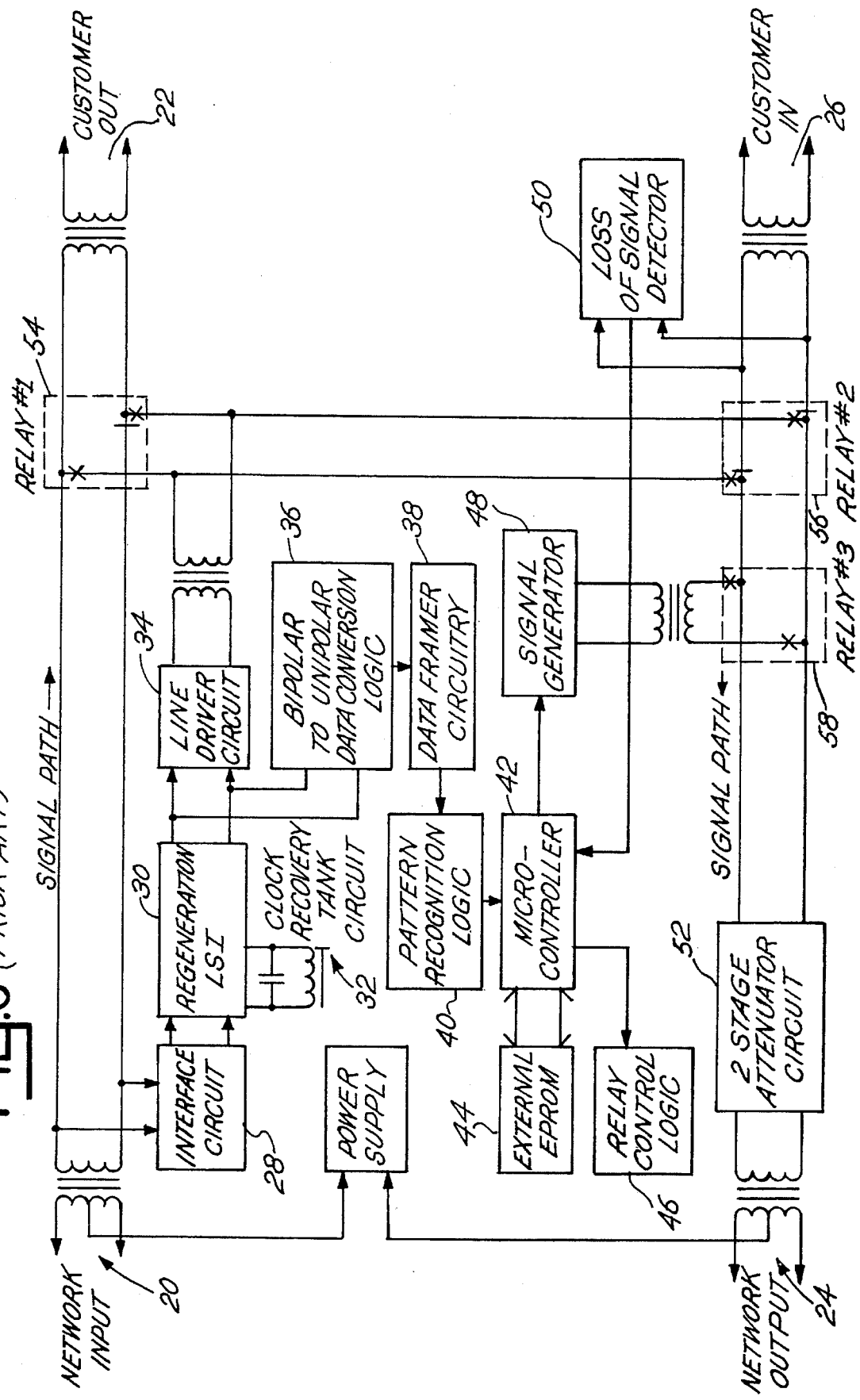
FIG. 3 is block diagram of a prior art network interface unit.

Referring first to FIGS. 1 and 2, there is shown an advantage of the present invention, namely the reduction in required size of the network interface unit ("NIU") 10. FIG. 1 illustrates a shelf unit 12 designed to hold the prior art network interface units, in accordance with industry standards. Each slot 14 in the shelf unit of FIG. 1 is 1.433 inches wide.

FIG. 2, in contrast, illustrates a shelf unit designed to hold the network interface units made in accordance with the present invention 16. The width of an NIU made in accordance with the present invention may preferably be 0.717 inches, which is exactly half the width of the prior art NIU. Accordingly, in the span of a 17.68 inch shelf unit, the present invention allows 24 slots to hold 24 network interface units 10, whereas in the same 17.68 inch span of a shelf unit, it would only be possible to hold 12 prior art network interface units. Each NIU 10 is found on a single, multilayered printed circuit wiring board. The prior art NIUs included assemblies having two such boards mounted together in a side-by-side relationship.

Referring now to FIG. 3, there is illustrated a prior art embodiment of a Type-400 NIU which is embodied on a dual printed circuit board device having a width of approximately 1.4 inches for mounting in a standard shelf. A payload signal in the form of a digital data stream is carried into the NIU on a pair of network input lines 20. Under normal conditions, the payload passes through a first relay 54 and then exits the NIU on customer output transmission lines 22. Thus, electrically, the NIU is transparent to a payload signal.

Inside the NIU, the payload data stream also passes to an interface circuit 28, which passes the data stream to a regeneration large scale integrated circuit 30, such as part number XR-277 manufactured by the EXAR company. The regeneration circuit 30, which must be connected to a clock recovery tank circuit 32, regenerates the data signal. The signal is then passed to a line driver circuit 34, which then passes the signal to the customer output transmission lines 22.

Interposed between the regeneration circuit 30 and the line driver circuit 34 is a bipolar to unipolar data conversion circuit 36, which converts data from bipolar coding to unipolar coding and passes the signal to data framer circuitry 38. The data framer circuity 38 detects framing patterns. From the data framer circuitry 38, the data then passes to pattern recognition logic circuitry 40, which, for instance, scans the data stream for codes sent by the central office.

A microcontroller 42, such as one manufactured by Intel Inc. as part number 80C31, receives the data stream from the pattern recognition logic circuitry 40 and communicates with an external EPROM 44. The microcontroller in turn communicates with relay control logic circuitry 46 and with signal generator circuitry 48.

Customer input transmission lines 26 enter the NIU and carry a payload that passes through a loss-of-signal detector 50 and a two-stage attenuator circuit 52. The loss-of-signal detector is connected to and communicates with the microcontroller 42. After passing through the two-stage attenuator circuit 52, the data exits the NIU on the network output transmission lines 24.

A second relay 56 is connected to the customer input transmission lines 26 subsequent to the loss-of-signal detector 50. Upon detection of a predetermined pattern in the data stream, the microcontroller 42 and relay control logic 40 may cause the first and second relays 54, 56 to turn off the customer input and output transmission paths, and to instead enter a loopback mode. In the loopback mode, the network input data stream (from the network input 20) is passed through the first and second relays 54, 56 and returned through the two-stage attenuator circuit 52 to the network output lines 24.

A third relay 58 is connected on the return transmission lines down line from the second relay 56. The signal generator 48 (which is controlled by the microcontroller 42) is connected with the third relay 58. Thus, for example, upon detection of a predetermined pattern in the data stream, the microprocessor 42 may cause the signal generator 48 to generate a specific signal that will then pass through the third relay 58, through the two-stage attenuator circuit 52, and out through the network output transmission lines 24.

The high density network interface unit of the present invention improves over the prior art Type-400 NIU. Refer to FIGS. 4 and 5, in which a block diagram of an NIU 10 made in accordance with the present invention is illustrated. As shown in FIG. 4, the NIU 10 is substantially mounted on a single, multi-layered printed circuit board 11. In the present context, printed circuit board refers to any such substantially planar circuit board or to a combination of such boards affixed to each other in a substantially planar relationship (rather than in an adjacent surface relationship). The board 11 measures approximately 5½ inches on each side. A face plate 13 is mounted orthogonally along one edge of the board 11.

A payload signal enters the NIU 10 on the network transmission input lines 20. These may be referred to as incoming digital telephone lines, since data comes to the customer premises through these lines. The payload may pass directly through a first relay 60 in the NIU and exit on the customer output lines 22, which may also be referred to as the incoming customer premises lines. Similarly, network output transmission lines 24 may also be referred to as outgoing digital telephone lines, and the customer input transmission lines 26 may be referred to as outgoing customer premises telephone lines.

In addition, internal to the NIU, the payload signal passes to a regeneration large scale integrated circuit 62, which is connected to a quartz crystal controlled phase locked loop ("PLL") circuit 64. In the preferred embodiment, the regeneration circuit 62 is part number LXT312 or LXT315 as manufactured by Level 1 Communications Inc. The PLL circuit 64 connected to the regeneration circuit 62 provides a means for synchronizing the clock signal on the receiving line with the internal locally generated clock. The interface circuit 28 and clock recovery tank circuit 32 of the prior art NIU are thus eliminated.

The regeneration large scale integrated circuit 62 is connected to an application specific integrated circuit ("ASIC") 66, to which the regeneration circuit 62 passes the data. The ASIC 66 of the present invention is manufactured by LSI Logic, Inc. Alternatively, a product manufactured by the Xilinx corporation, described as a "programmable gate array" (part number XC2018, XC3030 or XC3042), could be used in place of the LSI Logic ASIC.

In the preferred embodiment, the single ASIC 66 provides (i) bipolar to unipolar data conversion, (ii) data framer circuitry, (iii) pattern recognition logic, (iv) signal generation, and (v) loss of signal detection, each of which will be discussed below. The ASIC 66 integrally communicates with and cooperates with a microprocessor 68 (such as a Motorola MC68705C8 microprocessor, or, alternatively, the Intel 87C51 or the Texas Instruments TMS70C00) having an internal "one-shot" EPROM. The microprocessor 68 and at ASIC 66 communicate with each other via a bus 67. The microprocessor 68 and ASIC 66 may be considered as a single, unitary controller 69. Substantial "savings" of space on the board is thus achieved by using such an ASIC-microprocessor based controller 69 to control the operation of the NIU 10.

The microprocessor 68 is also connected to relay drive circuitry 70 for controlling the first relay 60 and a second relay 72. Notably, in the prior art, the EPROM 44 was external to the microcontroller 42. By designing the EPROM to be internal to the microprocessor 68 of the present invention, the required circuit board area is reduced.

A control system is encoded on the EPROM internal to the microprocessor 68. The control system is embodied in software integrally communicating with and integrally cooperating with the ASIC 66 in order to perform various functions. Again, implementation of the control function with software or firmware in the controller 69 allows substantial savings of space on the board 11. A detailed discussion of the control system encoded in the preferred embodiment of the present invention is provided below.

As noted, the ASIC provides bipolar to unipolar conversion. Bipolar digital data is in essence an AC signal, in which every other 1 is positive and every other 1 is negative. Thus, bipolar coding provides that a logic 0 is encoded with zero voltage while a logic 1 is alternatively encoded with positive and negative voltages. The average voltage level is thereby maintained at zero in order to eliminate dc components in the signal spectrum.

A unipolar signal, in contrast, involves only positive numbers. A bipolar signal is in fact two unipolar signals, one representing positive bits and one representing negative bits, both aligned by a local clock.

As is well-known by those of ordinary skill in the art, AC signals travel better over long distances than do DC signals. Therefore, throughout the telecommunication network transmission lines, signals are transmitted in AC form. However, a microprocessor is incapable of understanding bipolar signals. Therefore, for purposes of the NIU 10, the bipolar signal must be converted into a unipolar signal prior to or upon entry to the NIU 10.

The conversion from bipolar to unipolar encoding in the preferred embodiment of the present invention is accomplished in two stages. First, the regeneration large scale integrated circuit 62 converts the positive half of the incoming bipolar signal to a first unipolar pulse and the negative half of the incoming bipolar signal to a second unipolar pulse. Next, the first and second unipolar pulses enter the ASIC 66, which passes the pulses through an OR gate, thereby producing a single unipolar (or DC) pulse representative of the payload signal. As will be discussed below, line driver circuitry then gives the resultant unipolar signal sufficient power to enable transmission of the signal in DS1 format (1.544 Mbps).

The ASIC 66 of the present invention also provides framer circuitry. In a T-1 system, every 193rd bit is a framing bit. The framer circuitry in the preferred ASIC scans the incoming data in order to find the predetermined framing pattern. The NIt/may thus utilize the organized frame structure to detect or generate communication signals such as responses to maintenance or status requests.

The ASIC 66 also provides pattern recognition circuitry and signal generation circuitry. Thus, for example, the NIU is capable of scanning the incoming data stream for status requests sent by a remote line element or test set. Through its signal generation circuitry, the ASIC may independently or responsively produce communication signals in the data stream. In the preferred embodiment, the signal generation circuitry produces only high bits (1's). Examples of signals that may be generated include responsive signals sent to the central office to provide information requested by a test set, alarm indication signals ("AIS") to provide a warning signal indicating, for instance, that framing has been lost, and loopback indication signals ("LIS"), to indicate to the central office that the NIU has entered loopback mode.

As noted above, the incoming signal path passes through a first relay 60. When the controller 69 recognizes a predetermined pattern or signal in the incoming data stream requesting a loopback, the controller 69 may cause the data stream to pass through a line driver hybrid circuit 76, onto the outgoing signal path, through a two stage attenuator circuit 78, and out from the NIU 10 on the network output transmission lines 24.

The controller 69 may also recognize other requests, found on the lines 20 and 26, that makes the NIU 10 move into other modes of operation or provide additional information. Such information is provided along the lines 20 and 24 by the controller 69 in the form of a data signal. Notably, the controller 69 supplies the requested information via one of the relays 60, 72 (also used for loopback) rather than via a third separate relay. Thus, the space requirements for the board 11 are again reduced.

In many prior art NIUs, a line driver circuit utilized discrete electric components. In contrast, the line driver hybrid circuits 74, 76 in the NIU of the present invention use conductive ink resistors and surface-mounted semiconductors attached to a ceramic substrate to help reduce the circuit board area required.

Similarly, the two-stage attenuator circuit 78 in the preferred embodiment of the present invention utilizes thick film resistor networks. Such networks use a conductive ink on a ceramic substrate to replace many discrete resistor elements that would otherwise be on the board 11.

As noted above, a control system is encoded on the EPROM internal to the microprocessor 68. This control system integrally communicates with and cooperates with the ASIC 66 via the bus 67 to perform various functions. A detailed discussion of the architecture of the ASIC 66 and the programs used by the microprocessor 68 in order to perform such functions are described below.

Figure 6:
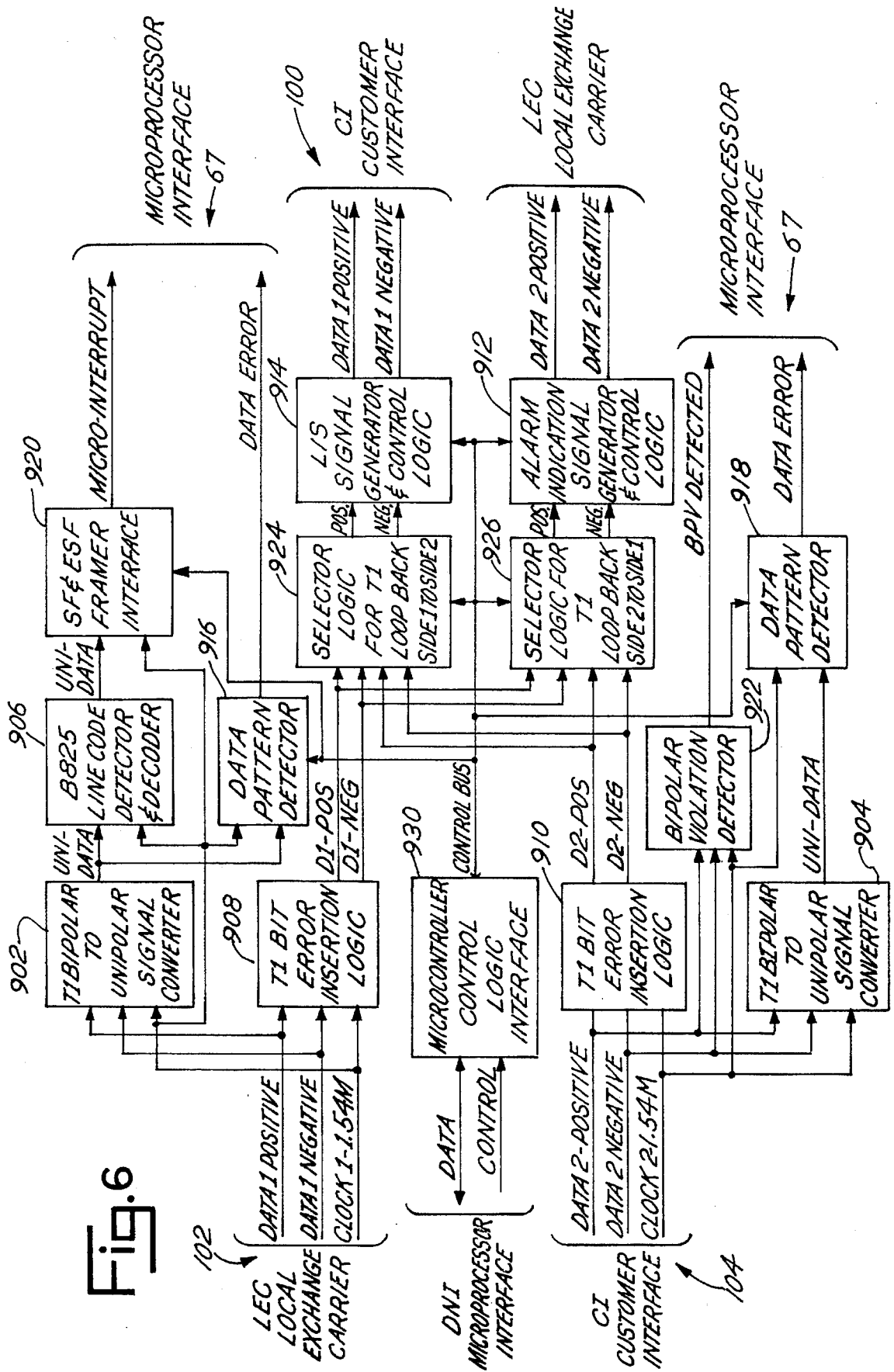
FIG. 6 is a block diagram of the application specific integrated circuit shown in FIG. 5.

FIG. 6 illustrates the architecture of the ASIC 66. As noted, the ASIC 66 provides bipolar to unipolar data conversion, shown at blocks 902–904. In addition, the ASIC 66 scans the incoming data stream to detect and decode a B8ZS line code, shown at block 906. The ASIC 66 also scans the incoming data stream, at block 920, in order to determine whether the data stream is arranged in superframing or extended superframing form.

The ASIC inserts "errors" in the data stream, according to a predetermined pattern, at blocks 908–910. The errors are introduced according to a pattern in order to communicate with external equipment, which understands that errors in the payload, following certain formats, are made by the NIU in order to communicate information.

In addition, at block 912, the ASIC 66 generates the above-discussed alarm indication ("AIS") signal, and, at block 914, the ASIC 66 generates the above-discussed loopback indication signals in the data stream. At blocks 916–918, the ASIC 66 detects patterns in the incoming data stream as discussed above, and, at block 922, the ASIC determines whether a violation of bipolar coding rules has taken place in the incoming data stream. At blocks 924–926, the ASIC 66 provides selector logic to maintain appropriate loopback conditions. An interface for the integral communication between the ASIC 66 and the microprocessor 68 of the present invention is shown at block 930.

Figure 7:
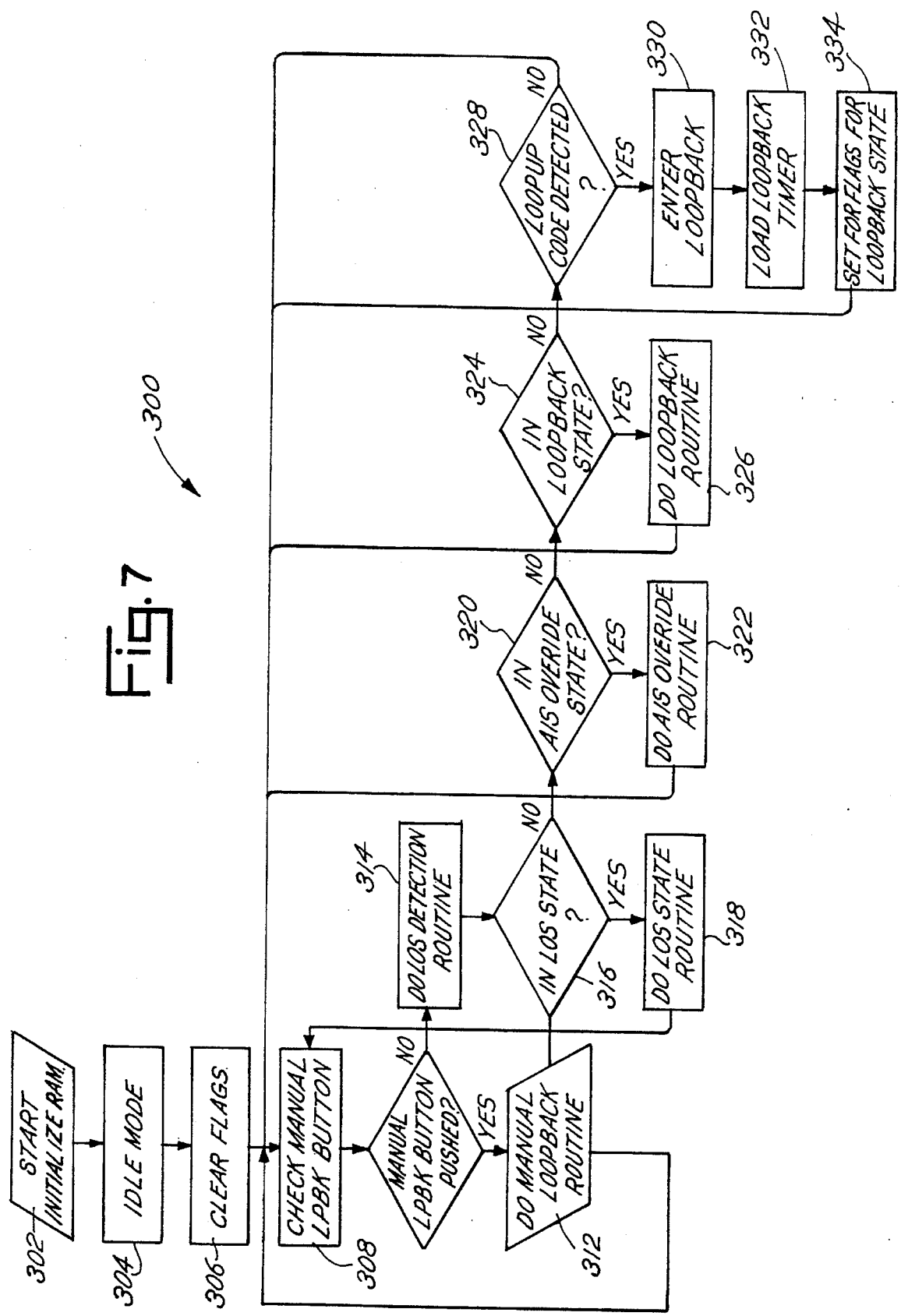
FIG. 7 is a flow chart of a Main/Idle Routine employed by the microprocessor shown in FIG. 5.

Flow charts showing a program used by the microprocessor 68 to implement the control function are shown in FIGS. 7–12. Referring first to FIG. 7, there is shown a presently preferred embodiment of a Main/Idle routine 300 employed by the microprocessor 68 of the present invention, thus embodying the present control system. The control system begins, at steps 302–306 by entering idle mode and clearing flags. In idle mode, the control system is prepared to receive predetermined signals indicating that the NIU should go into loopback mode or should respond to various states.

An NIU of the present invention may be provided with a manual button, which places the NIU in a loopback condition. Thus, at steps 308–310, the control system checks to see whether the manual loopback button is pressed. If so, then at step 312 the control system performs the steps of a Manual Loopback Routine as illustrated in the flow chart shown in FIG. 8.

Figure 8:
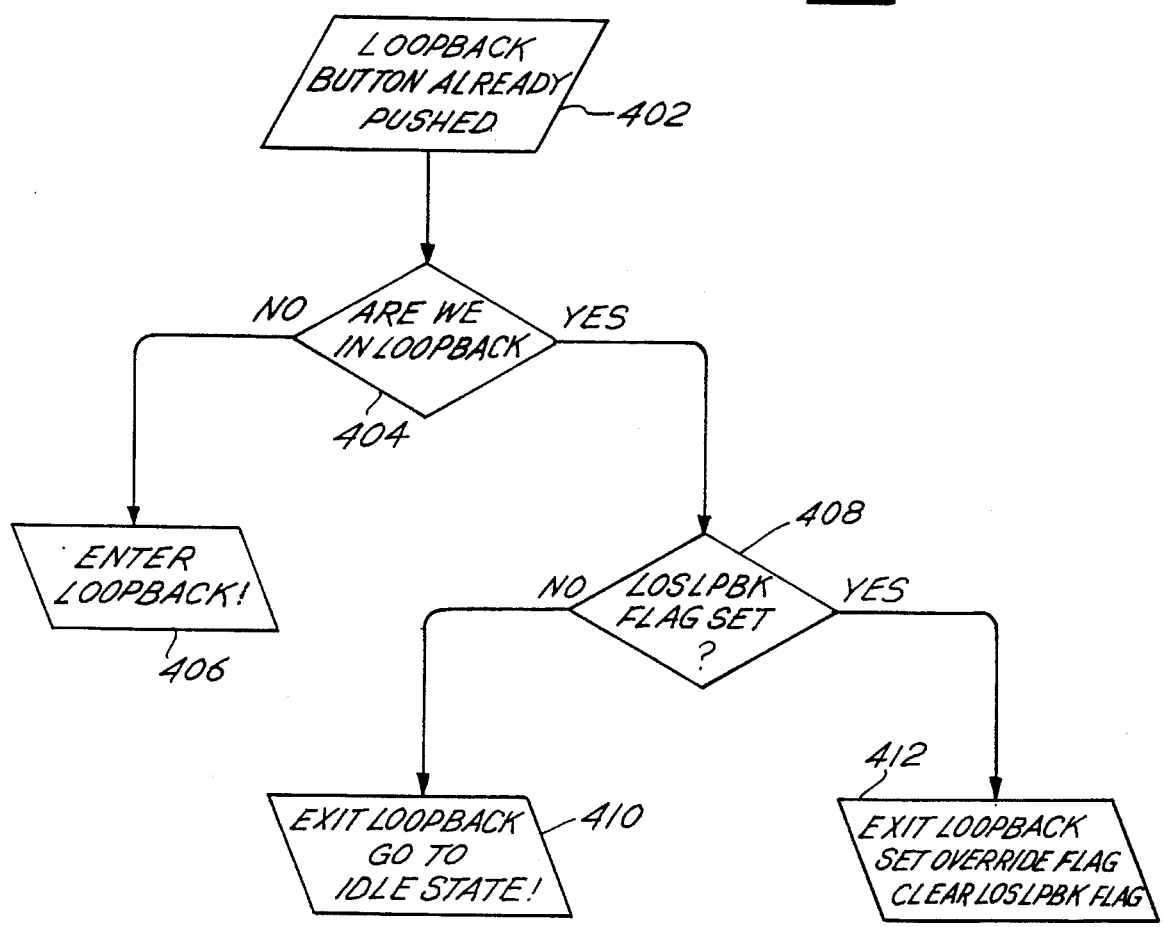
FIG. 8 is a flow chart of a Manual Loopback Mode Routine employed by the microprocessor shown in FIG. 5.

Referring to FIG. 8, at step 402, the control system is presumed to have determined that the manual loopback button has been pushed. Thus, at step 404, the control system determines whether the NIU is currently in loopback mode. If not, then the control system causes the NIU to enter loopback mode at step 406. However, if already in loopback, then at step 408, the control system determines whether the Loss of Signal ("LOS") Loopback flag is set. The LOS Loopback flag would be set if the control system had determined that no signal other than all zeros was being received by the NIU from the customer input transmission lines (i.e., from the customer side of the NIU). Had the control system detected a loss of signal, then the control system would cause the NIU to enter LOS Loopback mode, returning signals, for instance, sent to the NIU from the central office.

If, at step 408, it is determined that the LOS Loopback flag is not set, then the control system causes the NIU to exit loopback at step 410 and to return to the Main/Idle state depicted in FIG. 7. However, if, at step 408, it is determined that the LOS Loopback flag was set, then the control system needs to exit loopback mode so that, for instance, the central office may see what is happening on the other side of the NIU. Thus, at step 412, the control system exits loopback, sets an override flag to indicate that LOS Loopback has been overridden, and clears the LOS Loopback flag. The control system then returns to the Main/Idle state.

Referring again to FIG. 7, after having performed the Manual Loopback Routine at step 312, the control system then returns to an idle state beginning again at step 308. If, however, it was determined at step 310 that the manual loopback button has not been pushed, then at step 314, the control system performs a Loss of Signal Detection Routine, as illustrated by the flow chart shown in FIG. 9.

Figure 9:
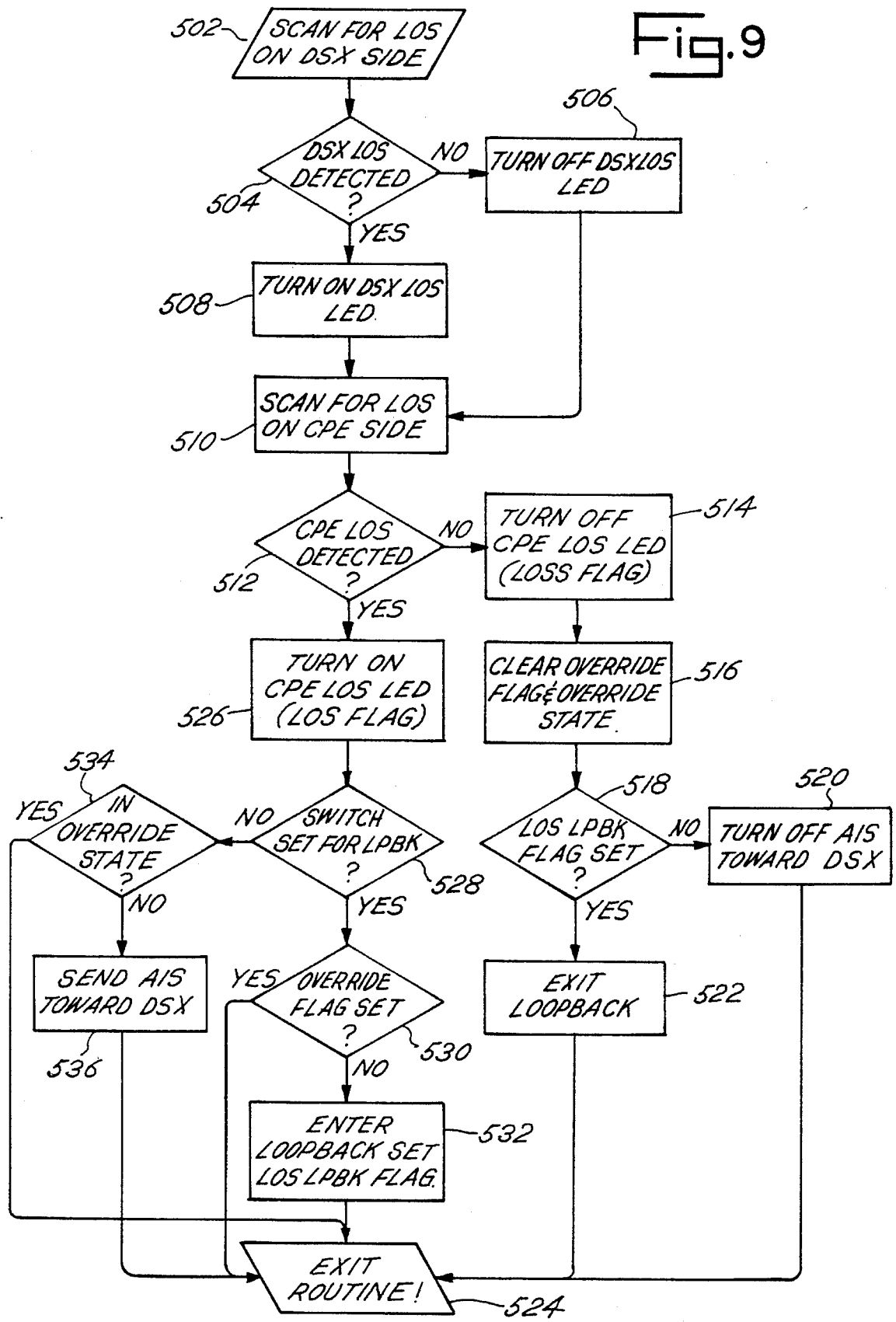
FIG. 9 is a flow chart of a Loss of Signal Detection Routine employed by the microprocessor shown in FIG. 5.

Referring to the Loss of Signal Detection Routine of FIG. 9, at steps 502–504, the control system first scans for a loss of signal on the DSX, or network, side of the NIU. A loss of signal generally consists of a signal comprising all zeros. If a loss of signal is not detected on the DSX side of the NIU, then the DSX LOS LED is turned off at step 506. However, if a loss of signal on the DSX side is detected, then the DSX LOS LED is turned on at step 508.

Next, the control system scans for a loss of signal on the customer premises ("CPE") side of NIU at steps 510–512. If a loss of signal on the CPE side of the NIU is not detected, then the CPE LOS LED is turned off at step 514. The override flag and override state have been previously set to indicate that the NIU was in an override state, in which the NIU would not react to a loss of signal. Once the CPE LOS LED has been turned off at step 514, the control system clears the override flag and override state at step 516 so that the NIU can again react to a loss of signal.

In response to a loss of signal, the NIU of the present invention may be configured either to enter LOS Loopback mode or to begin sending an alarm indication signal ("AIS") to the DSX. The AIS is a form of data signal sent along the lines 20–26 by the controller 69. Therefore, in case a loss of signal was detected, the control system determines at step 518 whether the Loss of Signal Loopback flag is set. If the LOS Loopback flag is not set, then the NIU was configured to send an AIS to the DSX rather than to enter loopback (assuming a loss of signal was detected). Therefore, since a CPE LOS was not detected at step 512, the control system turns off the AIS towards the DSX at step 520 and exits the Loss of Signal Detection Routine at step 524. However, if the LOS Loopback flag is set at step 518, then at steps 522–524, the control system causes the NIU to exit loopback, and the control system exits the Loss of Signal Detection Routine.

If, at step 512, a CPE LOS was detected, then the CPE LOS LED is turned on at step 526. At step 528, the control system then determines whether an optional switch on the NIU has been set for loopback. If so, then, if the override flag is set, the control system exits the Loss of Signal Detection Routine at step 524, but if the override flag is not set, the control system first enters loopback and sets the Loss of Signal Loopback flag at step 532, and then exits the Loss of Signal Detection Routine at step 524. However, if the control system determines that the optional switch for loopback is not set, then at step 534 the control system determines whether the NIU is in an override state. If so, then the control system exits the Loss of Signal Detection Routine at step 524. If not, however, then at step 536 the control system sends an alarm indication signal toward the DSX at step 536 and then exits the Loss of Signal Detection Routine at step 524.

Referring once again to the Main/Idle Routine shown in FIG. 7, after having performed the Loss of Signal Detection Routine at step 314, the control system determines whether the NIU is in a loss of signal state (that the NIU has determined that the payload is an extended periods of zeros) at step 316. If so, then at step 318 the control system performs a Loss of Signal State Routine as illustrated by the flow chart shown in FIG. 10.

Figure 10:
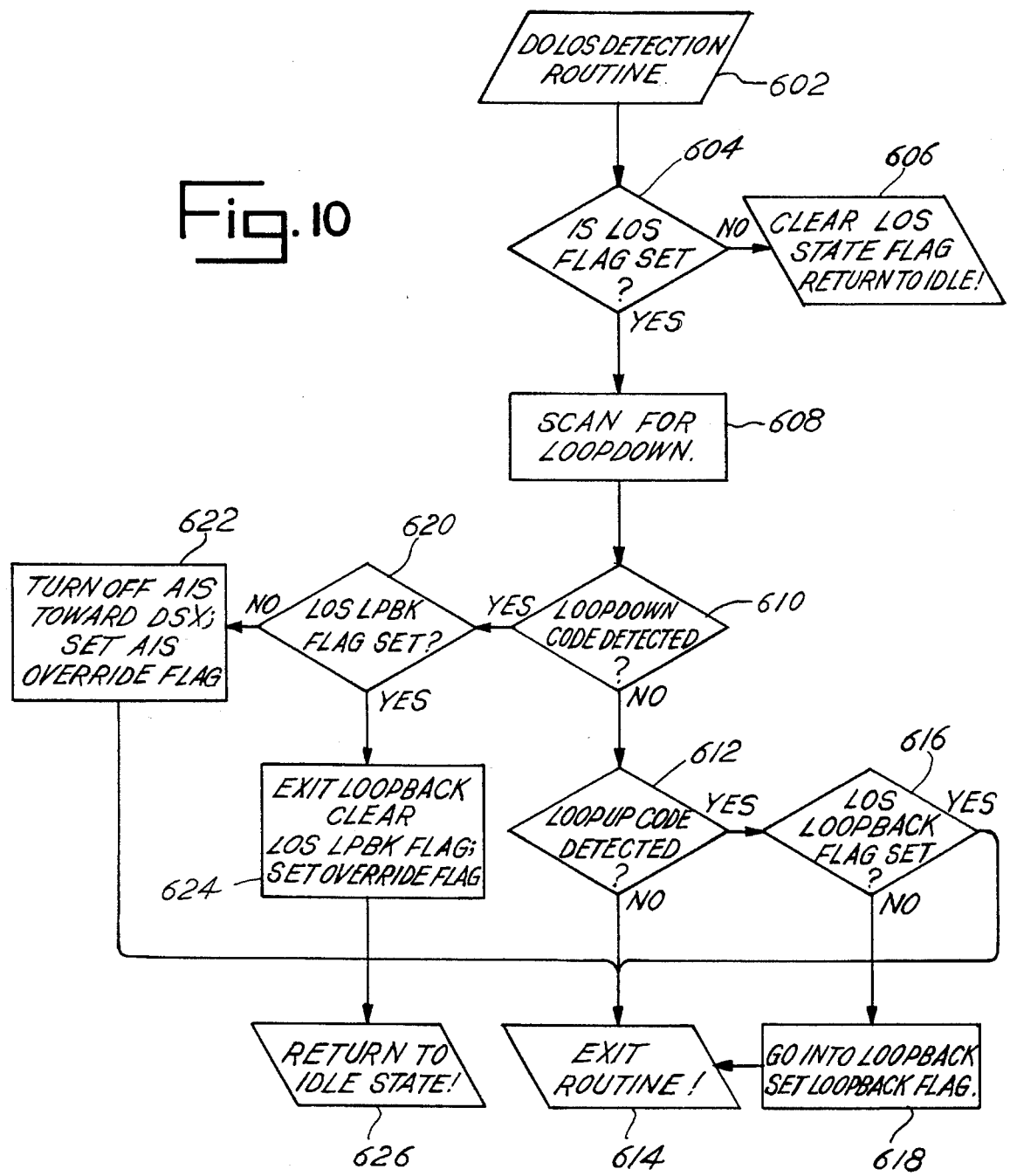
FIG. 10 is a flow chart of a Loss of Signal Routine employed by the microprocessor shown in FIG. 5.

Thus, referring now to FIG. 10, at step 602, the control system first ensures that a loss of signal has been detected, by repeating the Loss of Signal Detection Routine shown in FIG. 9. Next, at step 604, the control system determines whether the Loss of Signal flag is set. If the loss of signal flag is not set, then the loss of signal no longer exists; therefore, at step 606, the control system clears the Loss of Signal State flag and returns to the idle state at step 308 shown in FIG. 7. However, if the loss of signal flag is set, then, at steps 608–610, the control system scans for a loopdown code.

The control system must determine whether the NIU is in Loss of Signal Loopback mode (pursuant to an optional configuration in which the NIU responds to loss of signal by entering LOS Loopback), or rather whether the NIU is sending an AIS to the DSX (pursuant to an optional configuration in which the NIU responds to a loss of signal by sending an AIS to the DSX). Thus, if a loopdown code is not detected at step 610, then, at step 612, the control system must determine whether the NIU is receiving a loop-up code (because the NIU might be sending an AIS rather than being in LOS Loopback). If a loop-up code is not detected, then the control system exits the Loss of Signal State Routine at step 614. However, if a loop-up code is detected at step 612, then if the Loss of Signal Loopback flag is set, the control system exits the Loss of Signal State Routine at step 614, but if the Loss of Signal Loopback flag is not set, then, at steps 618 and 614, the control system causes the NIU to enter loopback and sets the loopback flag and exits the Loss of Signal State Routine.

If, however, a loopdown code is detected at step 610, then, at step 620, the control system determines whether the Loss of Signal Loopback flag is set. If the Loss of Signal Loopback flag is not set, then at step 622, the control system has the capability to turn off the AIS and sets the AIS override flag to indicate that the AIS has been overridden. If, however, the Loss of Signal Loopback flag is set, then, at step 624, the control system exits loopback, clears the Loss of Signal Loopback flag, and sets the override flag to indicate that Loss of Signal Loopback has been overridden. At step 626, the control system then returns to idle state at step 308 of the Main/Idle routine shown in FIG. 7.

Returning to FIG. 7, after having performed the Loss of Signal State Routine, the control system returns to idle mode at step 308. If, however, it was determined at step 316 that the NIU was not in a Loss of Signal State, then, at step 320, the control system determines whether the NIU is in an AIS Override state. An AIS Override state would exist where the NIU had been sending all 1's to the DSX but was stopped so that the DSX could see what was happening on the CPE side of the NIU. If the NIU is in an AIS Override state, then, at step 322, the control system performs the steps of an AIS Override State Routine as illustrated by the flow chart shown in FIG. 11.

Figure 11:
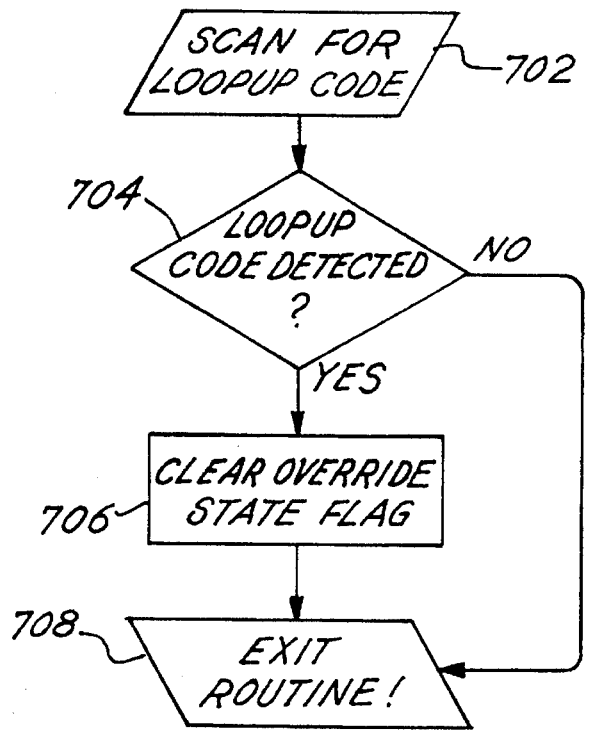
FIG. 11 is a flow chart of an Alarm Indication Signal Override Routine employed by the microprocessor shown in FIG. 5.

Referring to FIG. 11, at steps 702–704, the control system scans the data stream for a loop-up code. If the control system detects a loop-up code, then it must exit override; thus, at step 706, the control system clears the override state flag. The control system then exits the AIS Override Routine at step 708.

Referring again to FIG. 7, after the AIS Override Routine is performed at step 322, the control system returns to idle state at step 308. If, however, the control system determined at step 320 that the NIU is not in an AIS Override State, then, at step 324, the control system determines whether the NIU is in Loopback state. If the NIU is in Loopback state, then, at 326, the control system performs the steps of a Loopback Routine as illustrated by the flowchart shown in FIG. 12.

Figure 12:
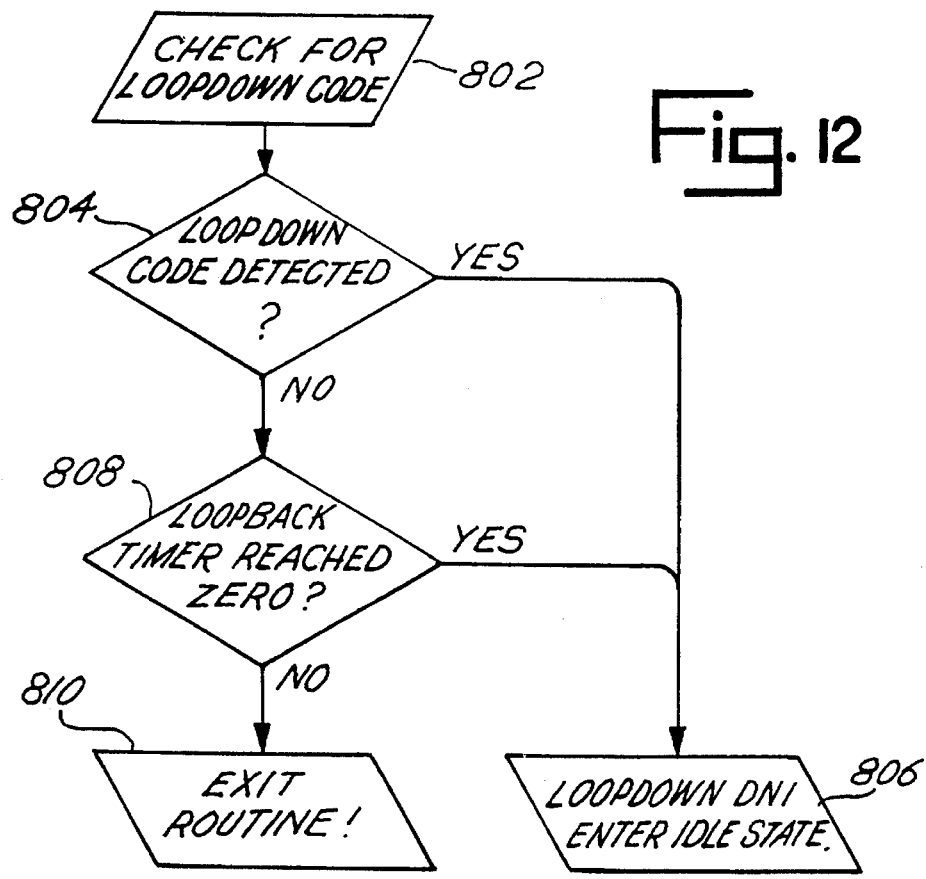
FIG. 12 is a flow chart of a Loopback Routine as employed by the microprocessor shown in FIG. 5.

Turning to FIG. 12, at steps 802–804, the control system checks for a loopdown code. If a loopdown code is detected, then, at step 806, the control system causes the NIU to exit loopback, and the control system returns to idle state at step 308 shown in FIG. 7. However, if a loopdown code is not detected, then, at step 808, the control system determines whether the optional loopback timer has reached zero. If the loopback timer has reached zero, then the control system causes the NIU to exit loopback, and the control system returns to idle stat at step 308 shown in FIG. 7. However, if the loopback timer has not expired, then the control system exits the Loopback Routine at step 810.

Returning once again to the Main/Idle Routine illustrated by the flow chart shown in FIG. 7, after performing the Loopback Routine at step 326, the control system returns to an idle state at step 308. However, if the control system determined at step 324 that the NIU is not in a Loopback State, then, at step 328, the control system determines whether a loop-up code is detected. If loop-up code is detected, then, at steps 330–334, the control system enters loopback, loads the loopback timer and sets flags for Loopback State. The control system then returns to an idle state at step 308.

In addition to the above-discussed routines as illustrated by the flow charts shown in FIGS. 7–12, the microprocessor 68 of the present invention preferably includes the following routines:

DEBOUNCE.S This routine looks at a switch line to determine whether it changes state.

DEFINE.S This routine sets flags used by other routines.

EQU.S This routine prepares the random access memory (RAM) that is used in the microprocessor 68.

ESF_SUBS.S This routine serves two purposes. First, this routine detects ESF (Extended Superframe) framing within the data stream coming from the span. If ESF is detected, then an LED is turned on, and data link bits are gathered from the framing bits. Second, this routine determines whether the data link message is a command. In particular, in the preferred embodiment, the control system looks for two commands, the ESF Loop-up and the ESF Loopdown commands. If either of these commands are detected by this routine, then appropriate flags are set, which are relied upon by loop-up and loopdown scan routines.

INT.S This is a timed interrupt routine, which ensures that the microprocessor 68 continues running and which keeps track of all software timers and counters used in the various routines in the microprocessor 68. In addition, this routine flashes a Loopback LED when the system is in a timed loopback.

LPBK_TBL.S This is a table used to determine whether a valid ESF Data Link command was read.

MAIN_SUB.S This is a compilation of routines, each cooperating with other routines performed by the control system. Included in this routine are: (i) scan routines that determine the number of errors detected when scanning for a given pattern; (ii) office loopback routine that throws the relays and set the ASIC for loopback; (iii) office off routine that turns off the relays and returns the gate array to normal state; (iv) loading routines that load the gate array with the 16 bit pattern sought to be recognized by the scanning routine; (v) subroutines to delay or set timers which are used throughout the control system; and (vi) serial output routine that writes the control registers to the gate array.

OFFICFAC.S This file contains the routines to scan for loop-up or loopdown codes. In addition, these routines check the flags for ESF (DL) loop-up or ESF (DL) loopdown.

SETUP.S This routine prepares the main registers for the microprocessor 68, clears the RAM and initializes various control registers and flags.

As suggested above, the microprocessor 68 and ASIC 66 integrally communicate and cooperate to control the functions of the NIU. This integral cooperation is illustrated by the framing system. The microprocessor 68 and gate array are connected at three lines that are used for framing, namely the CLK_INHIBIT, the IRQ, and the ESF_DATA. The IRQ line is an interrupt line that is toggled by the gate array every 125 microseconds, which is the time that it takes 193 bits (a single frame) to enter the gate array. The CLK_INHIBIT line is driven from the microprocessor 68. When the CLK_INHIBIT line is toggled, it causes the gate array to slip one bit. The ESF_DATA line informs the processor of the state of the bit currently being examined.

If the data is not framed, then the processor will apply an algorithm to the input data to frame up the unit to ESF. In particular, the control system collects eight bits from the input line. These eight bits are 193 bits apart and are read each time the IRQ line is toggled. The algorithm separates the eight bits into four groups of two bits. These groups are then compared to incoming data in order to determine whether they match the ESF framing pattern.

If all of the groups of bits do not match the ESF framing pattern, then the CLK_INHIBIT line is toggled and it starts over again. If one of the groups fits the ESF framing pattern, the algorithm will continue comparing the incoming data for the groups until 24 bits match the framing pattern. When this occurs, the ESF_FRAME_UP bit is set to indicate that ESF data is currently being received.

When the unit is receiving ESF data, it checks input data to stay within $10^{**}(-3)$ error rate. If two consecutive frame bits are in error or four consecutive frames are in error, then the unit deems that the data is unframed.

Although the foregoing description of the preferred embodiment will enable a person of ordinary skill in the art to make and use the invention, the following detailed assembly language listing is included below. The listing provides detailed information concerning the programming and operation of the overall system. Additional detailed features of the system will become apparent to those skilled in the art from reviewing the program.

Copyright © 1993 Teltrend, Inc.

MAIN.S

```
;***********************************************************************
;     PURPOSE: This routine is the main command routine. It controls
;         what state we're in(idle,lpbk...) and what patterns, switches
;         or other control features we look for.
;***********************************************************************
MAIN:
        JSR   LOAD_GATE_ARRAY         ;initialize gate array BCLR  $ARM_FLAG               ;clear,look for ESF loopup
        BSET  LPBK_LED                ;make sure lpbk led is off
        BRA   start_chk_main
in_main:
        BRCLR HARD_LOOP,chk_hard_loop
        JSR   DO_MAN_LPBK             ;perform manual lpbk
        BSET  ARM_FLAG                ;to check esf lpwn code
        BCLR  HARD_LOOP               ;done checking
        BRCLR HARD_LOOP_O,start_chk_main   ;if in lpbk,ignore lpbk code
chk_hard_loop:
        JSR   chk_los_AIS             ;check LOS and AIS enable/disable SWs
        JSR   check_loopdown_code
        BRCLR $COMP_FLAG,in_main      ;SCAN FOR PATTERN IN ONE DIRECTION
main_man_lpdn:
        JSR   LOOP_DWN start_chk_main:
        JSR   chk_manual_lpbk
        BRSET HARD_LOOP,in_main
        JSR   chk_los_AIS             ;check loss of signal and AIS enable/disable SWs
        LDX   main_current_state
        LSLX                          ;multiply reg X by 2
        JMP   main_state_table,X    ;

main_state_table:
        BRA   NORMAL_STATE            ;0 ,normal state
        BRA   AIS_OVERRIDE_STATE      ;2 ,ais override state
        BRA   AIS_LOS_STATE           ;4 ,ais state
        BRA   start_chk_main          ;6 ,should never be reached
        BRA   IN_LPBK_STATE           ;8 ,lpbk state NORMAL_STATE:
        BCLR  $ARM_FLAG               ;clear this flag to begin process and look for esf arm code
        BCLR  SENDING_ONES            ;This flag indicates in the process
```

```
                            ;of qualifying loopup code
            JSR  check_loopdown_code   ;check loopdown code including esf lpdwn for both side
      ARM_LOOP:
            JSR  chk_los_AIS           ;check LOS and AIS enable/disable SWs
 5          BRSET CPE_LOS_LED,chk_normal_to_lpbk  ;jmp if no los of signal
            BRSET $LOS_LPBK_OVR,chk_normal_to_lpbk
            LDA  #main_ais_state_value
            STA  main_current_state    ;go to AIS state
            JMP  NORMAL_STATE_EXIT 10    chk_normal_to_lpbk:
            JSR  chk_arming
            BRSET $COMP_FLAG,ARM_CODE_DET   ;jmp if arming went away
            BRA  NORMAL_STATE_EXIT
      ARM_CODE_DET:
15          BSET $ARM_FLAG             ;esf int only look for lpdwn code ;*********************
      ; loop up the unit now
      ;*********************

DO_OFFICE_LPBK:
20          JSR  OFFICE_ON
            BCLR $LOS_LPBK_OVR
            LDA  #main_in_lpbk_value
            STA  main_current_state    ;go to LPBK state

NORMAL_STATE_EXIT:
25          JMP  MAIN_EXIT

IN_LPBK_STATE:

;**********************************************
      ;
      ; The unit is in loopback now and looking for
30    ; univ. loopdown codes
      ;
      ;**********************************************

DWN_CONT1:
            JSR  chk_arming
35          JSR  check_loopdown_code   ;check loopdown code including esf lpdwn for both side
            BRSET $COMP_FLAG,DWN_CODE_DET   ;CHECK IF 1ST COMP IS MADE
            BRA  IN_LPBK_STATE_EXIT DWN_CODE_DET:
40          JSR  LOOP_DWN
            LDA  #main_normal_state_value   ;go to normal state
            STA  main_current_state    ;go to normal state
```

-28-

```
          IN_LPBK_STATE_EXIT:
              BRA   MAIN_EXIT

AIS_OVERRIDE_STATE:
              BCLR  $ARM_FLAG                ;clear look for esf loopup code
 5            JSR   check_loopdown_code      ;check loopdown code including esf lpdwn
              JSR   chk_arming
              BRCLR $COMP_FLAG,AIS_OVERRIDE_STATE_EXIT  ;jmp if arming went away
              LDA   #main_normal_state_value
              STA   main_current_state
10        AIS_OVERRIDE_STATE_EXIT:
              BRA   MAIN_EXIT AIS_LOS_STATE:
              JSR   chk_los_AIS              ;check LOS and AIS enable/disable SWs
              BRCLR CPE_LOS_LED,chk_ais_lpdn ;jmp if still in los of signal
15            LDA   #main_normal_state_value ;go to NORMAL state
              STA   main_current_state       ;go to NORMAL state
              BRA   AIS_LOS_STATE_EXIT
          chk_ais_lpdn:
              JSR   check_loopdown_code      ;check loopdown code including esf lpdwn for both
20        side
              BRCLR $COMP_FLAG,chk_ais_lpup  ;CHECK IF 1ST COMP IS MADE
              LDA   #main_ais_override_value ;go to ais override state
              STA   main_current_state       ;go to ais override state
              JSR   XMT_AIS_xilinx           ;no ais to dsx side
25            BRCLR $LOS_AIS_SW_N,MAIN_EXIT  ;branch if not LOS lpbk
              JSR   OFFICE_OFF               ;take unit out of lpbk
              BCLR  SPAN_AIS
              BCLR  LOS_LPBK_FLAG            ;clear LOS loopback flag
              BSET  LOS_LPBK_OVR             ;set LOS loopback override flag
30            LDA   #main_normal_state_value ;go to NORMAL state
              STA   main_current_state       ;go to NORMAL state
              BRA   AIS_LOS_STATE_EXIT
          chk_ais_lpup:
              BCLR  $ARM_FLAG                ;clear, look for esf arm code
35            JSR   chk_arming
              BRCLR $COMP_FLAG,AIS_LOS_STATE_EXIT    ;jmp if arming went away
              BRSET LOS_LPBK_FLAG,AIS_LOS_STATE_EXIT ;branch if in los lpbk
              JSR   OFFICE_ON
              LDA   #main_in_lpbk_value
40            STA   main_current_state       ;go to LPBK state
          AIS_LOS_STATE_EXIT:

MAIN_EXIT:
              JMP   start_chk_main

MAIN_LOP.S

45        ;------------------------------------------------------------------
```

-29-

```
;       PURPOSE: This routine checks the status of the manual lpbk switch
;           and sets flags accordingly, the second part puts the dni
;           in lpbk or takes it out of lpbk depending on current status.
;-----------------------------------------------------------------
chk_manual_lpbk:
   BRSET   HARD_LOOP,MANUAL_LOOP_EXIT
   BRSET   MANUAL_LBK_O_N,DN_O             ;JUMP IF NO MANUAL LOOPBACK
   chk_debounce DN_O,MANUAL_LBK_O_N,CPORT  ;50 ms debounce checking
   BRSET   STATE_CHANGE_O,MANUAL_LOOP_EXIT  ;if no change,jmp
   BSET    STATE_CHANGE_O
   BSET    HARD_LOOP                ;manual lpbk needs attention
   BSET    man_lpbk_O               ;manual lpbk
   BRA     MANUAL_LOOP_EXIT
DN_O:
   BCLR    STATE_CHANGE_O

MANUAL_LOOP_EXIT:
   RTS

DO_MAN_LPBK:
   BRSET   LOOP_FLAG_O,clr_office_loop    ;jmp if lpbk was on
   JSR     OFFICE_ON                ;CALL LOOPUP SUB-ROUTINE
   BSET    HARD_LOOP_O              ;set manual lpbk_O to on
   BCLR    man_lpbk_O
   BRA     MAN_LPBK_EXIT
clr_office_loop:
   BRSET   LOS_LPBK_FLAG,DO_OVERRIDE     ;branch if LOS lpbk
   JSR     LOOP_DWN
   BCLR    man_lpbk_O
   BRA     MAN_LPBK_EXIT
DO_OVERRIDE:                        ;DO LOS LPBK OVERRIDE
   LDA     #main_ais_override_value     ;go to ais override state
   STA     main_current_state           ;go to ais override state
   JSR     XMT_AIS_xilinx               ;no ais to dsx side
   JSR     OFFICE_OFF
   BCLR    man_lpbk_O
   BCLR    SPAN_AIS
   BCLR    LOS_LPBK_FLAG
   BSET    LOS_LPBK_OVR
   LDA     #main_normal_state_value     ;go to NORMAL state
   STA     main_current_state           ;go to NORMAL state
   LDA     #10D
   JSR     DELAY_WAIT
   BCLR    HARD_LOOP_O                  ;turn manual lpbk flag off

MAN_LPBK_EXIT:
   RTS

LOS.S
```

```
;***********************************************************************
;       PURPOSE: This routine checks for LOS from both sides and reacts
;               to the situation accordingly. This includes checking the
;               switch to see if we send AIS or go into Loopback on a
;               CPE LOS.
;***********************************************************************

;-----------------------------------------------------------------
; loss of signal and AIS enable/disable checking
;-----------------------------------------------------------------
chk_nonmon_debounce:    #macro
        BRSET $1,$2,chk_SW_LOW$$       ;jmp if SW is disable(active low)
        BRSET $3,$4,chk_nonmon_debounce_EXIT$$   ;jmp with no change in SW and it is enable
        BRA   chk_SW_debounce$$
chk_SW_LOW$$:                          ;SW is deactive
        BRCLR $3,$4,chk_nonmon_debounce_EXIT$$ ;jmp with no change in SW and it is disable
chk_SW_debounce$$:
        chk_debounce $5,$1,$2    ;switch changed,50 ms debounce checking
        BSET  $3,$4              ;switch is qualified to be active
        BRA   chk_nonmon_debounce_EXIT$$
$5:                              ;SW is disable after checking
        BCLR  $3,$4              ;switch is qualified to be deactive
chk_nonmon_debounce_EXIT$$:
        #endm chk_loss_debounce_xilinx:
reload_los_debounce:
        LDX  TIME_150MS
scan_los_again:
        JSR  SCAN_QUALIFY              ;CHK IF PATTERN IS BEING RECEIVED
        BRSET HARD_LOOP,chk_loss_debounce_xilinx_exit
        BRCLR $COMP_FLAG,reload_nolos_debounce ;IF 1ST COMP LINE IS HIGH THEN PATT. DETECTED
        DEX
        BNE  scan_los_again
        BRA  chk_loss_debounce_xilinx_exit
reload_nolos_debounce:
        LDX  TIME_150MS
scan_nolos_again:
        JSR  SCAN_QUALIFY              ;CHK IF PATTERN IS BEING RECEIVED
        BRSET HARD_LOOP,chk_loss_debounce_xilinx_exit
        BRSET $COMP_FLAG,reload_los_debounce ;IF 1ST COMP LINE IS HIGH THEN PATT. DETECTED
        DEX
        BNE  scan_nolos_again
chk_loss_debounce_xilinx_exit:
        RTS
```

-31-

```
        export chk_los_AIS chk_los_AIS:
        BCLR COMP_FLAG
        BCLR LP_2SEC_DET
5       LDA  #TIME_0SEC              ;set scan time to 0 seconds(2ms)
        STA  qualify_time
        BCLR DATA_SEL                ;set to office side
        JSR  DET_LOS_CODE            ;GO SET UP GATE ARRAY
        JSR  SCAN_QUALIFY            ;CHK IF PATTERN IS BEING RECEIVED
10      BRSET HARD_LOOP,ABORT_CHECK
        BRCLR $COMP_FLAG,chk_prev_nolos_dsx ;IF COMP LINE IS HIGH THEN PTRN DETECTED
        BRSET LOS_DSX_FLAG,dsx_led_los
        JSR  chk_loss_debounce_xilinx
15      BRCLR $COMP_FLAG,dsx_led_nolos    ;IF COMP LINE IS HIGH THEN PTRN DETECTED
        BSET LOS_DSX_FLAG
    dsx_led_los:
        BCLR NET_LOS_LED             ;turn on LOS led for dsx side
20      BRA  chk_fac_los
    chk_prev_nolos_dsx:
        BRCLR LOS_DSX_FLAG,dsx_led_nolos
        JSR  chk_loss_debounce_xilinx
        BRSET $COMP_FLAG,dsx_led_los     ;IF COMP LINE IS HIGH THEN PTRN
25      DETECTED
        BCLR LOS_DSX_FLAG
    dsx_led_nolos:
        BSET NET_LOS_LED             ;turn off loss of signal led for dsx side
    chk_fac_los:
30      BCLR COMP_FLAG
        LDA  #TIME_0SEC              ;set scan time to 0 seconds(2ms)
        STA  qualify_time
        BSET DATA_SEL                ;set to fac side
        JSR  DET_LOS_CODE            ;GO SET UP GATE ARRAY
35      JSR  SCAN_QUALIFY            ;CHK IF PATTERN IS BEING RECEIVED for 1 sec.
        BRSET HARD_LOOP,ABORT_CHECK
        BRSET $COMP_FLAG,chk_prev_los_span ;IF HIGH THEN PATTERN DETECTED BRSET LOS_SPAN_FLAG,chk_again 40      JMP  chk_span_regen

ABORT_CHECK:
        RTS chk_again:
        JSR  chk_loss_debounce_xilinx
45      BRSET $COMP_FLAG,span_led_los     ;IF HIGH THEN PATTERN DETECTED
```

-32-

```
           BCLR  LOS_SPAN_FLAG
           BRA   span_led_nolos chk_prev_los_span:               ;WE SEE LOS, WAS IT HERE BEFORE
           BRSET LOS_SPAN_FLAG,span_led_los   ;YES, SO CONTINUE
 5         JSR   chk_loss_debounce_xilinx    ;NO, SO DOUBLE CHECK PATTERN
           BRSET $COMP_FLAG,do_span_los      ;IF HIGH THEN PATTERN DETECTED
           JMP   chk_span_regen              ;PATTERN DROPPED SO LEAVE do_span_los:
           BSET  LOS_SPAN_FLAG
10   span_led_los:
           BCLR  CPE_LOS_LED           ;turn on LOS led for fac side
           BRSET LOOP_FLAG_O,chk_span_ais_sw  ;if in lpbk, jmp
     clr_terms:                        ;cpe loss
           BRCLR OFC_TERM,chk_clrcpe
15         LDA   #025D
           JSR   DELAY_WAIT
           BCLR  OFC_TERM
     chk_clrcpe:
           BRCLR CPE_TERM,chk_span_ais_sw
20         LDA   #025D
           JSR   DELAY_WAIT
           BCLR  CPE_TERM chk_span_ais_sw:
                       c h k _ n o n m o n _ d e b o u n c e
25   LOS_AIS_SW_N,LOS_AIS_SW_FLAG,NO_LPBK_AIS_SW
           BRCLR LOS_AIS_SW_FLAG,set_span_lpbk   ;jmp if LOS LPBK SW is enabled
           BRA   update_AIS_out set_span_lpbk:
           BRSET LOS_LPBK_OVR,update_AIS_out  ;branch if override enabled
30         BSET  SPAN_AIS               ;turn on ais
           BRSET LOOP_FLAG_O,update_AIS_out   ;if in lpbk, jmp
           BSET  LOS_LPBK_FLAG          ;LOS initiated lpbk
           JSR   OFFICE_ON              ;go into lpbk
           BSET  ARM_FLAG
35         BRA   update_AIS_out span_led_nolos:
     no_los_fac:
           BSET  CPE_LOS_LED            ;turn off loss of signal led for fac side
           BCLR  LOS_LPBK_OVR           ;CLEAR LOS LPBK OVERRIDE
40   NO_OVR_CLR:
           BRSET LOS_LPBK_FLAG,set_terms      ;branch if LOS initiated lpbk
           BRSET LOOP_FLAG_O,clear_span_ais   ;if in lpbk, jmp
           BRSET LOS_LPBK_FLAG,update_AIS_out ;if in override, branch BRSET OFC_TERM,chk_setcpe
45         LDA   #025D
```

```
              JSR   DELAY_WAIT
              BSET  OFC_TERM
          chk_setcpe:
              BRSET CPE_TERM,chk_los_AIS_EXIT
 5            LDA   #025D
              JSR   DELAY_WAIT
              BSET  CPE_TERM
              BRA   chk_los_AIS_EXIT        ;do nothing
          set_terms:                        ;no cpe loss
10            BCLR  LOS_LPBK_FLAG
              JSR   OFFICE_OFF
          clear_span_ais:
              BCLR  SPAN_AIS
              BRSET LOOP_FLAG_0,update_AIS_out  ;if in lpbk, jmp
15            BRCLR K2_RELAY,update_AIS_out
              BCLR  $K2_RELAY               ;ENERGIZE COIL
              LDA   #050D
              JSR   DELAY_WAIT update_AIS_out:
20        chk_span_regen:
              JSR   XMT_AIS_xilinx
          chk_los_AIS_EXIT:
              RTS ;----------------------------------------------------------
25        ; SET CONTROL BYTE to XILINX to XMT AIS to both sides
          ;----------------------------------------------------------
              export XMT_AIS_xilinx XMT_AIS_xilinx:
              BRSET LOOP_FLAG_0,get_out     ;if in lpbk, jmp
30            BRCLR SPAN_AIS,set_normal
              BRSET main_ais_override_state,set_normal
              LDA   #AIS_to_dsx_value       ;send AIS to dsx
              STA   GATE_ARRAY_REG2         ;MODIFY HEADER BYTE
              BRA   chk_relay 35        set_normal:
              LDA   #normal_control_value
              STA   GATE_ARRAY_REG2         ;MODIFY HEADER BYTE
          chk_relay:
          chk_clrk2:                        ;normal regen on or sending ais
40            BRCLR LIS_RELAY,get_out
              LDA   #025D
              JSR   DELAY_WAIT
              BCLR  LIS_RELAY
          get_out:
45            RTS
```

DEBOUNCE.S

```
;----------------------------------------------------------------
;       PURPOSE: This routine is a macro that gets assembled within
;               other routines. It checks for a switch to be changed
;               for a period of time before accepting it.
;---------------------------------------------------------------- region "MAIN"
;----------------------------------------------------------------
; macro routine for debounce checking
;----------------------------------------------------------------
chk_debounce:   #macro
chk_man_debounce$$:
    LDA    #015D
    LDX    #0FFH
D_2_LOOP_man_lpbk$$:
    BRSET  $2,$3,chk_no_man_debounce$$  ;JUMP IF line goes non_active
    DEX
    BNE    D_2_LOOP_man_lpbk$$
    DECA
    BEQ    D_2_EXIT_man_lpbk$$
    LDX    #0FFH
    JMP    D_2_LOOP_man_lpbk$$
D_2_EXIT_man_lpbk$$:
    BRA    chk_debounce_EXIT$$          ;return to the caller,success
chk_no_man_debounce$$:                  ;line is non_active
    LDA    #020D                        ;60 ms debounce time
    LDX    #0FFH                        ;
D_2_LOOP_man_lpbk_n$$:
    BRCLR  $2,$3,chk_man_debounce$$     ;JUMP IF line goes active
    DEX
    BNE    D_2_LOOP_man_lpbk_n$$
    DECA
    BEQ    D_2_EXIT_man_lpbk_n$$
    LDX    #0FFH
    JMP    D_2_LOOP_man_lpbk_n$$
D_2_EXIT_man_lpbk_n$$:
    BRA    $1                           ;jmp to the caller,fail
chk_debounce_EXIT$$:
    #endm
```

DEFINES

```
        region "ports"
;----------------------------------------------------------------
;----------------------------------------------------------------
#define    POWER_LED    7,APORT  ;(O) 1,CONTROLS XILINK RESET LINE
;#define   DONE_PIN     6,APORT  ;(I) 0,FOR MONITORING XILINK
#define    LD_SHIFT     5,APORT  ;(O) 0,LATCHS 8 BIT WORD TO G.A.
#define    spare_1      4,APORT  ;(O) 1,
```

-35-

```
        #define    CPE_LOS_LED     3,APORT ;(O) 1,cpe loss of signal
        #define    spare_2         2,APORT ;(O) 1,
        #define    NET_LOS_LED     1,APORT ;(O) 1,network loss of signal
        #define    LIS_RELAY       0,APORT ;(O) 0,LIS relay 5      #define    DATA_SEL        7,BPORT ;(O) 0,NOT A   B SELECT LINE
        #define    SER_DATA        6,BPORT ;(O) 0,SERIAL DATA TO E^2 AND XILINK
        #define    DSEL            5,BPORT ;(O) 1,data select for u9
        #define    SDOUT           4,BPORT ;(O) 1,data output for u9
        #define    CLK_INHIBIT     3,BPORT ;(O) 1,esf clock inhibit
10      #define    LPBK_LED        2,BPORT ;(O) 1,lpbk led
        #define    OFC_TERM        1,BPORT ;(O) 0,office side termination
        #define    CPE_TERM        0,BPORT ;(O) 0,cpe side termination define    SER_CLK         7,CPORT ;(O) 1,SERIAL DATA CLK FOR E^2 & XILINK
        #define    ESF_LED         6,CPORT ;(O) 1,esf framing led
15      #define    K2_RELAY        5,CPORT ;(O) 0,lpbk relay
        #define    BPV_IN          4,CPORT ;(I) 1,BPV
        #define    X_RESET         3,CPORT ;(O) 1,CONTROLS XILINK RESET LINE
        #define    MANUAL_LBK_O_N  2,CPORT ;(I) 1,manuel lpbk switch
        #define    CCLK            1,CPORT ;(O) 1,CLK FOR DOWNLOADING AFTER RESET TO
20      XILINKS
        #define    bit_193_MCSDATA 0,CPORT ;(O,I) 1,esf bit 193 and mcs file data ouput define    LOS_AIS_SW_N    3,DPORT ;(I) 1,AIS      0,LPBK
        #define    INBAND_AUTO_SW  4,DPORT ;(I) 1,INBAND(ALL)  0,AUTO ESF/SF
        ;#define   DSX_REGEN_SW_N  4,DPORT ;(I) 1,REGEN DSX   0,REGEN disabled
25      ;-------------------------------------------------------------
        #define    SENDING_ONES    0,FLAG1 ;Placeholder-no longer used
        #define    LOOP_FLAG_O     3,FLAG1 ;office lpbk 0=NONE 1=LOOPBACK ON
        #define    COMP_FLAG       4,FLAG1 ;
        #define    ARM_FLAG        7,FLAG1

30      #define    sf_rcv_arming   0,SF_CURRENT_STATE
        #define    sf_rcv_lpdwn    1,SF_CURRENT_STATE define    timeout_flag    2,FLAG3
        #define    LP_2SEC_DET     6,FLAG3 ;Set when loopup code has been
                                            ;qualified for 3 seconds.
35      #define    STATE_CHANGE_O  0,FLAG4 ;flag for manuel lpbk buttom
        #define    HARD_LOOP_O     2,FLAG4 ;1= in manuel lpbk toward office
        #define    HARD_LOOP       4,FLAG4 ;1= manuel lpbk buttoms are pressed
        #define    man_lpbk_O      5,FLAG4 define    LOS_AIS_SW_FLAG 0,FLAG5 ;1=LOS_AIS_SW is enable
40      #define    LOS_LPBK_FLAG   1,FLAG5 ;1=LOS INITIATED LPBK
        #define    LOS_DSX_FLAG    2,FLAG5 ;1=LOSS of SIG form DSX
        #define    LOS_SPAN_FLAG   3,FLAG5 ;1=LOSS of SIG form SPAN
        #define    INBAND_AUTO_FLAG 4,FLAG5 ;1=AUTO DETECTION else INBAND(all)
        ;define    DSX_REGEN_FLAG  4,FLAG5 ;1=REGEN DSX SIG
45      #define    SPAN_AIS        5,FLAG5 ;1=require to send AIS to DSX
```

-36-

```
      #define   LOS_LPBK_OVR    6,FLAG5   ;1=LOS LPBK OVERRIDE
      #define   DL_16BITS_FLAG  7,FLAG5   ;=1=check loop codes until 16 DL define   ERR_CNT0   7,GATE_ARRAY_REG2    ;error count of control byte to xilinx
      #define   ERR_CNT1   6,GATE_ARRAY_REG2    ;error count of control byte to xilinx
  5   #define   ERR_CNT2   5,GATE_ARRAY_REG2    ;error count of control byte to xilinx
      #define   ERR_CNT3   4,GATE_ARRAY_REG2    ;error count of control byte to xilinx
      #define   ERR_CNT4   3,GATE_ARRAY_REG2    ;error count of control byte to xilinx
      #define   CONT_C     2,GATE_ARRAY_REG2    ;C cross bit of control byte to xilinx
      #define   CONT_B     1,GATE_ARRAY_REG2    ;B FAC bit of control byte to xilinx
 10   #define   CONT_A     0,GATE_ARRAY_REG2    ;A DSX bit of control byte to xilinx define   power_on_bit   0,power_byte    ;I bit to xilinx
      #define   span_cutoff    1,power_byte    ;I bit to xilinx define   main_ais_state          1,main_current_state
      #define   main_ais_override_state 0,main_current_state
 15   #define   main_in_lpbk_state      2,main_current_state define   ESF_ARM_DET    0,ESF_CURRENT_STATE   ;1=rcv esf lpup code
      #define   ESF_DWN_DET    1,ESF_CURRENT_STATE   ;1=rcv esf lpdn code
      #define   get_esf_lpbk   7,ESF_CURRENT_STATE   ;receive esf lpbk codes flag define   ignore_esf_lpup  0,ESF_IGNORE_STATE  ;1=ignore esf lpup code
 20   #define   ignore_esf_lpdn  1,ESF_IGNORE_STATE  ;1=ignore esf lpdn code
      #define   ignore_esf_code  7,ESF_IGNORE_STATE  ;1=ignore esf lpbk code ;---------------------------------------------------------------
      ; MASK BIT FOR TIMER CAPTURE INTERRUPT  0 = INTERRUPT DISABLED (OFF)
      ;                 1 = INTERRUPT ENABLED   (ON)
 25   ;
      #define   ICR_INT_BIT  7,TCR   ;INTERRUPT MASK BIT FOR TIMER CAPTURE
      #define   IRQ_BIT      1,OPTION ;
      ;---------------------------------------------------------------

EQU.S

30   ;**************************************************************
      ;*          PORT-I/O-TIMER ASSIGNMENTS                  *
      ;**************************************************************

APORT    DS 1   ;0 PORT A DATA REGISTER
      BPORT    DS 1   ;PORT B DATA REGISTER
 35   CPORT    DS 1   ;PORT C DATA REGISTER
      DPORT    DS 1   ;PORT D DATA REGISTER
```

```
        ADDR        DS  1   ;PORT A DATA DIRECTION REGISTER
        BDDR        DS  1   ;PORT B DATA DIRECTION REGISTER
        CDDR        DS  1   ;PORT C DATA DIRECTION REGISTER
                    DS  1   ;UNUSED
                    DS  1   ;UNUSED
                    DS  1   ;UNUSED
        SPCR        DS  1   ;A SERIAL PERIPHERAL CONTROL REGISTER
        SPSR        DS  1   ;SERIAL PERIPHERAL STATUS REGISTER
        SPDR        DS  1   ;SERIAL PERIPHERAL DATA I/O REGISTER
        SCBRR       DS  1   ;SERIAL COMM. BAUD RATE REGISTER
        SCCR1       DS  1   ;SERIAL COMM. CONTROL REGISTER 1
        SCCR2       DS  1   ;SERIAL COMM. CONTROL REGISTER 2
        SCSR        DS  1   ;10 SERIAL COMM. STATUS REGISTER
        SCDR        DS  1   ;SERIAL COMM. DATA REGISTER
        TCR         DS  1   ;TIMER CONTROL REGISTER
        TSR         DS  1   ;TIMER STATUS REGISTER
        ICHR        DS  1   ;INPUT CAPTURE HIGH REGISTER
        ICLR        DS  1   ;INPUT CAPTURE LOW REGISTER
        OCHR        DS  1   ;OUTPUT COMPARE HIGH REGISTER
        OCLR        DS  1   ;OUTPUT COMPARE LOW REGISTER
        CHR         DS  1   ;18 COUNTER HIGH REGISTER
        CLR         DS  1   ;COUNTER LOW REGISTER
        ACHR        DS  1   ;ALTERNATE COUNTER HIGH REGISTER
        ACLR        DS  1   ;ALTERNATE COUNTER LOW REGISTER
        PR          DS  1   ;PROGRAM REGISTER
        COPRR       DS  1   ;COP RESET REGISTER
        COPCR       DS  1   ;COP CONTROL REGISTER

;*****************************************************************
;*              TIMER LABLES                                     *
;*****************************************************************
;*****************************************************************
;*              1MS TIMERS                                       *
;*****************************************************************

TMR1        DS  1   ;
        TMR2        DS  1   ;
        TMR3        DS  1   ;
        MS_COUNTER  DS  1
        TIMEOUT_H   DS  1   ;Arming code fail-safe timeout
        TIMEOUT_L   DS  1   ;Arming code fail-safe timeout
;*****************************************************************
;*              100MS TIMERS                                     *
;*****************************************************************
;*****************************************************************
;*              1 MIN. TIMER                                     *
;*****************************************************************
;*****************************************************************
;*              FLAGS                                            *
;*****************************************************************
```

-38-

```
        FLAG1            DS   1
        SF_CURRENT_STATE DS   1
        FLAG3            DS   1
        FLAG4            DS   1
 5      FLAG5            DS   1
        main_current_state DS 1
        ESF_CURRENT_STATE DS  1
        ESF_IGNORE_STATE DS   1
    ;***********************************************************
10  ;*              BUFFERS AND POINTERS                      *
    ;*********************************************************** px_count         DS   1
        qualify_time     DS   1
        ;DL_CNT          DS   1
15      NONERR_CNT       DS   1
        SHFT_CNT         DS   1
        XTEMP0           DS   1   ;TEMP BUFFER FOR X REG DURING PROCESS
        XTEMP1           DS   1   ;TEMP BUFFER FOR X REG DURING DELAY
        XTEMP2           DS   1   ;TEMP BUFFER FOR X REG DURING DELAY2
20      TIMERCT          DS   1   ;
        TIMERADD         DS   1   ;TIMER ADDRESS POINTER
        TIMERADD2        DS   1   ;TMP BUF FOR TIMERADD DURING INTERRUPT
        OCRTEMPLO        DS   1   ;TMP BUF FOR TIMERADD FOR INTER.
        PREVIOUS         DS   1
25      TMR_U            DS   1
        TMR_L            DS   1
        INT_CNT          DS   1
        X_BYTE           DS   1   ;TMP STORAGE FOR XILINK DATA
        X_CNT            DS   1   ;COUNTER USED IN XILINK.S
30      ERROR_CNT        DS   1
        SEARCH_TMR       DS   1
        BIT_LEN          DS   1
        BLK_CNT          DS   1
        DET_PATTERN      DS   1
35      DET_PATTERN_2    DS   1
        GEN_PATTERN      DS   1
        SCAN_TMR         DS   1
        ERR_DATA_U       DS   1
        ERR_DATA_L       DS   1
40      PRE_ICHR         DS   1
        PRE_ICLR         DS   1
        RST_ICHR         DS   1
        RST_ICLR         DS   1
        DL_DATA_U        DS   1
45      DL_DATA_L        DS   1
        CNT_U            DS   1
        CNT_L            DS   1
        xmt_xilinx_buffer DS  4
        power_byte       equ  xmt_xilinx_buffer
50      GATE_ARRAY_REG2  equ  xmt_xilinx_buffer+1
```

-39-

```
        RPTR_ADDR        DS   1
        temp_buffer      DS   1
        bit_error_timer  DS   1
        esf_debounce_count DS 1    ;debounce counter for esf lpbk code
5       ESF_CURRENT_CODE DS   1    ;storage for esf current rcvd code
        DL_BYTE_COUNTER  DS   1    ;ESF DL BYTE COUNTER
        DL_BIT_COUNTER   DS   1    ;ESF DL bit COUNTER ;***********************************************************************
        ;*              SET TIMER CONTSANTS                        *
10      ;***********************************************************************

RESOL100   EQU 64H       ;CONSTANT FOR 100 RESOLUTION TIMERS
        RESOL10    EQU 0AH       ;CONSTANT FOR 10 RESOLUTION TIMERS
        RESOL40    EQU 28H       ;CONSTANT FOR 40 RESOLUTION TIMERS
15      TCV        EQU 07H       ;TIMER CONTROL REG. CONFIG. VAULE
        TSV        EQU 07H       ;TIMER DATA REGISTER START VAULE
        MOR        EQU 10H       ;INTERRUPT MASK VALUE
        LOWTIMERVAL  EQU 064H    ;LOW VALUE FOR INT. COUNTER
        HIGHTIMERVAL EQU 000H    ;HIGH VALUE  0FBHEQU251EQU1 MS EMULATOR
20      OPTION     EQU 1FDFH

TMR1_value EQU 04H       ;1 ms timer
        TMR2_value EQU 0C7H      ;199d, 200 ms timer
        TMR3_value EQU 050D      ;10s timer INT_CNT_value    EQU 10D
25      INT_CNT_value_2  EQU 008D    ;for scan routine
        ERROR_CNT_value  EQU 03D
        ERROR_CNT_value_2 EQU 04D    ;for scan routine ;LOOP_TO_TIME_H EQU 00H     ; 20 mins(+- 10s) loop timeout time in minutes
        ;LOOP_TO_TIME_L EQU 0121D   ; 20 mins loop timeout time in minutes
30      LOOP_TO_TIME_H  EQU 00H     ; 30 mins(+- 10s) loop timeout time in minutes
        LOOP_TO_TIME_L  EQU 0181D   ; 30 mins loop timeout time in minutes
        ARM_TO_TIME_H   EQU 002H    ; 2 hrs(+- 10s) Arm timeout time in minutes
        ARM_TO_TIME_L   EQU 0D1H    ; 2 hrs Arm timeout time in minutes
        CNT_DWN_2SEC    EQU 10D     ; Value to compare with SCAN_TMR to see if
35                                  ; 2 seconds have passed.

TIME_4SEC     EQU 020D  ;4 seconds counter
        TIME_3SEC     EQU 015D  ;3 seconds counter
        TIME_2SEC     EQU 010D  ;2 seconds counter
        TIME_1SEC     EQU  05D  ;1 seconds counter
40      TIME_400MS    EQU  02D  ;400 mseconds counter
        TIME_46000MS  EQU  02D  ;46000 mseconds counter
        TIME_0SEC     EQU   0D  ;0 seconds counter
        TIME_150MS    EQU  75D  ;150 mseconds counter

RAM_START     EQU 050H
```

```
                RAM_END      EQU  0BFH
                TCR_MASK     EQU  040H    ;THIS VALUE DISABLES THE INTERRUPTS
                                          ;AND SETS TCAP PIN FOR NEG. GOING EDGE

NONERR_THRES EQU  006D

5            ESF_HEADER       EQU 11111111B  ;ESF message header
              ESF_ARM1_CODE    EQU 00010010B  ;ESF universal arming code
              ESF_ARM2_CODE    EQU 00111100B  ;ESF repeater only arming code
              ESF_DWN1_CODE    EQU 00100100B  ;ESF universal loopdown code
              ESF_DWN2_CODE    EQU 00000110B  ;ESF repeater only loopdown code 10            ;*********** 16 bit xilinx code ******

AIS_to_both_value   EQU 11111011B     ;send AIS to both
              AIS_to_fac_value    EQU 11111001B     ;send AIS to fac
              AIS_to_dsx_value    EQU 11111010B     ;send AIS to DSX
              normal_control_value EQU 11111000B
15            ;LIS_to_dsx_value   EQU 11111101B     ;send LIS to office
              ;LIS_to_fac_value   EQU 11111110B     ;send LIS to fac
              LIS_to_dsx_value    EQU 11111110B     ;send LIS to office
              LIS_to_fac_value    EQU 11111101B     ;send LIS to fac
              lpbk_no_LIS_value   EQU 11111100B     ;lpbk with no LIS to fac(los lpbk)
20            ARM_CODE            EQU 11000110B     ;arming code 1 for 16 bits
              ARM_CODE_2          EQU 00110001B     ;arming code 2 for 16 bits
              ;ARM_CODE_CSU       EQU 10000010B     ;arming code 1 for 16 bits
              ;ARM_CODE_2_CSU     EQU 00001000B     ;arming code 2 for 16 bits
              LP_DWN_CODE         EQU 11100111B     ;all lpdn + disarm
25            LP_DWN_CODE_2       EQU 00111001B     ;all lpdn + disarm
              QUERY_CODE          EQU 11010101B     ;query code to require for sending error count
              LOS_CODE            EQU 00000000B     ;loss of signal code 1 for 16 bits
              LOS_CODE_2          EQU 00000000B     ;loss of signal code 2 for 16 bits main_normal_state_value EQU 00h      ;normal state value in main routine
30            main_ais_state_value    EQU 02h      ;ais state value in main routine
              main_ais_override_value EQU 01h      ;ais override state value in main routine
              main_in_lpbk_value      EQU 04h      ;in_lpbk state value in main routine lpup_value       EQU       81h       ;indicate esf lpup code rcvd. set bit 0 of
              SF/ESF_CURRENT_STATE
35            lpdn_value       EQU       82h       ;indicate esf lpdn code rcvd. set bit 1 of
              SF/ESF_CURRENT_STATE

DL_BYTE_COUNT   EQU  003H         ;DL BYTE COUNTER RELOAD VAULE

;**************************************************************
              ;*       DEFINE INTERRUPTS VECTORS                            *
40            ;**************************************************************
```

```
            region "vectors"

#define    UNUSED  2

DW  UNUSED
5           DW  READ1      ;SERIAL COMMUNICATIONS    (1FF6)
            DW  INT_TMR    ;TIMER INTURRUPT VECTOR   (1FF8)
            DW  IRQ        ;IRQ INTERRUPT VECTOR     (1FFA)
            DW  UNUSED
            DW  START      ;RESET INTERRUPT VECTOR   (1FFE)

10                              ESF_SUB.S list"off"
        #include   define.s
        #include   esf_def.h
            list"on"

15          export frame_seek_state
            export state_variable region0 "ramdata"

slip_variable  DS   1
            state_variable DS   5              ;state variable in state_machine_sub
20          state_1    equ   state_variable+1  ;state variable in start_state_machine
            state_2    equ   state_variable+2  ;state variable in start_state_machine
            state_3    equ   state_variable+3  ;state variable in start_state_machine
            state_4    equ   state_variable+4  ;state variable in start_state_machine
            frame_seek_state DS  1
25          esf_data       DS   1

;-----------------------------------------------------------
        ;Variable storage assigment when the unit is in  esf mode
        ;-----------------------------------------------------------
        ;
30      ;                            ;R0= state_variable
        ;                            ;R1= esf_data
            prev_bit_error    EQU   state_1   ;R2= 0 if the previous bit is not in error
            prev_frame_error  EQU   state_2   ;R3= 0 if the last frame byte is not in error
            frame_error_count EQU   state_3   ;R4= error counter for every frame byte
35          frame_bit_count   EQU   state_4   ;R5= frame bit counter
        ;                            ;R6= frame_seek_state frame_error_count_value  EQU 04H
            frame_bit_count_value    EQU 06H
```

-42-

```
        #define    SLIP  0,slip_variable   ;slip bit for rountine state_machine_sub
        #define    slip_1 1,slip_variable  ;slip bit for rountine start_state_machine
        #define    slip_2 2,slip_variable  ;slip bit for rountine start_state_machine
        #define    slip_3 3,slip_variable  ;slip bit for rountine start_state_machine
5       #define    slip_4 4,slip_variable  ;slip bit for rountine start_state_machine
        #define    esf_data_next_bit 2,esf_data    ;new esf bit position ESF_FRAME_VALUE EQU  094H  ;100101
        invalid_state_value EQU 0FFh  ;indicate invalid frame byte received for the state region "MAIN"

10      import DL_DATA_L
        import DL_DATA_U good_state: #macro

BCLR  ESF_FRAME_UP_N         ;5 turn on esf led
             LDX   frame_seek_state       ;4
15           LDA   set_slip_bit_table,X   ;6
             ORA   slip_variable          ;3
             STA   slip_variable          ;4 set slip bit
             CLR   state_variable         ;initial state for esf mode endm 20      slip_bit: #macro

LDX   frame_seek_state       ;3
             STA   state_variable,X       ;4
             LDA   clear_slip_bit_table,X
             AND   slip_variable
25           STA   slip_variable          ;clear slip bit endm export IRQ
        ;    export ESF_FRAMING
        ;_____
30      _____
        ;
        ; start of state machine
        ;
        ;_____
35      ;_____
        IRQ:
```

-43-

```
          ESF_FRAMING:

;     BRSET ESF_FRAME_UP_N,TRY_FRAME_UP  ;if not in esf mode,jmp
            BRCLR ESF_FRAME_UP_N,was_in_frame  ;if not in esf mode,jmp
            JMP   TRY_FRAME_UP
 5        was_in_frame:
            LDX   state_variable
            LSLX                    ;3 multiply reg X by 2
            JMP   esf_state_table,X ;4 esf_state_table:          ;3
10          BRA   esf_state_default ;0 ,initial state
            BRA   esf_state_DLH     ;2 ,DL high byte
            BRA   esf_state_CRC     ;4 ,CRC byte
            BRA   esf_state_DLL     ;6 ,DL low byte
            BRA   esf_state_FRAME   ;8 ,FRMAE byte 15        esf_state_default:
            LDA   #ESF_FRAME_VALUE
            STA   esf_data                  ;frame byte
            LDA   #00h
            STA   DL_DATA_L                 ;store into DL_DATA_L
20          STA   DL_DATA_U                 ;store into DL_DATA_H
            STA   prev_bit_error            ;reset error flag
            STA   prev_frame_error          ;reset error flag
            LDA   #frame_error_count_value
            STA   frame_error_count         ;restore frame error count
25          LDA   #frame_bit_count_value
            STA   frame_error_count         ;restore frame error count
            LDA   #02h
            STA   state_variable
            JMP   ESF_FRAMING_EXIT 30        esf_state_DLH:                    ;check data link bytes
          esf_state_DLL:                    ;check data link bytes
            JSR   ESF_LOOP_DETECT           ;check esf loop code
            INC   state_variable            ;update state variable
            JMP   ESF_FRAMING_EXIT 35        esf_state_CRC:
            INC   state_variable            ;update state variable
            JMP   ESF_FRAMING_EXIT esf_state_FRAME:
            BRCLR bit_193,esf_bit_193_0     ;5
40          ROL   esf_data                  ;update the current frame byte
            BCS   in_frame_bit_1            ;check to see if the new bit is correct
            BCLR  esf_data_next_bit
            BRA   lost_frame                ;the bit is not correct
          esf_bit_193_0:
```

-44-

```
              ROL  esf_data                    ;update the current frame byte
              BCC  in_frame_bit_0              ;check to see if the new bit is correct
              BSET esf_data_next_bit
        lost_frame:
  5           LDA  prev_bit_error
              BNE  lost_frame_slip             ;first time of lost bit? if no,jmp
              INC  prev_bit_error              ;yes,first time
              inc  prev_frame_error             ;last frame byte is in error
              DEC  frame_bit_count             ;
 10           TST  frame_bit_count             ;jmp if not new frame byte
              BNE  in_frame
              LDA  #frame_bit_count_value
              STA  frame_bit_count
        frame_byte_in_error:
 15           CLR  prev_frame_error            ;clear flag for last frame byte in error
              DEC  frame_error_count
              TST  frame_error_count           ;4 consecutive frame bytes in error ?
              BNE  in_frame
        lost_frame_slip:
 20           BSET ESF_FRAME_UP_N              ;turn off esf led
              CLR  frame_seek_state            ;set to the initial state for esf framing routine
              JMP  ESF_FRAMING_EXIT in_frame_bit_1:
              BSET esf_data_next_bit           ;store new bit to the next position
 25           BRA  bit_in_frame
        in_frame_bit_0:
              BCLR esf_data_next_bit           ;store new bit to the next position
        bit_in_frame:
              CLR  prev_bit_error
 30           DEC  frame_bit_count             ;
              TST  frame_bit_count
              BNE  in_frame                    ;jmp if new frame byte is not ready
              LDA  #frame_bit_count_value
              STA  frame_bit_count             ;restore frame bit counter
 35           TST  prev_frame_error
              BNE  frame_byte_in_error         ;jmp if previous frame is in error
              LDA  #frame_error_count_value
              STA  frame_error_count           ;restore frame error count
        in_frame:
 40           LDA  #01h
              STA  state_variable              ;update state_variable
              JMP  ESF_FRAMING_EXIT TRY_FRAME_UP:
              LDX  frame_seek_state       ;3 load frame_seek_state
 45           LSLX                        ;3 multiply reg X by 2
              JMP  seek_state_table,X     ;4
```

-45-

```
seek_state_table:              ;3
        BRA   seek_state_default ;0 ,frame_seek_state = 0
        BRA   seek_state_1     ;2 ,frame_seek_state = 1
        BRA   seek_state_2     ;4 ,frame_seek_state = 2
        BRA   seek_state_3     ;6 ,frame_seek_state = 3
        BRA   seek_state_4     ;8 ,frame_seek_state = 4 seek_state_default:            ;initial esf framing routine
;       BSET  CLK_INHIBIT      ;5
;       BCLR  CLK_INHIBIT      ;5
        LDA   #1EH             ;2
        STA   slip_variable    ;4
        LDA   #00H             ;2
        STA   state_1
        STA   state_2
        STA   state_3
        STA   state_4
        INC   frame_seek_state
        JMP   ESF_FRAMING_EXIT seek_state_1:
        BRSET slip_1,go_state_machine
        INC   frame_seek_state ;5
        BRA   ESF_FRAMING_EXIT
seek_state_2:
        BRSET slip_2,go_state_machine
        INC   frame_seek_state ;5
        BRA   ESF_FRAMING_EXIT
seek_state_3:
        BRSET slip_3,go_state_machine
        INC   frame_seek_state ;5
        BRA   ESF_FRAMING_EXIT
go_state_machine:
        JSR   state_machine_sub   ;6  call state machine
        INC   frame_seek_state ;5
        BRA   chk_slip_variable ;3
seek_state_4:
        BRCLR slip_4,update_frame_seek
        JSR   state_machine_sub   ;6  call state machine
update_frame_seek:
        LDA   #01d
        STA   frame_seek_state chk_slip_variable:
        LDA   slip_variable ;3  check slip bits
        BNE   ESF_FRAMING_EXIT ;3  jmp if one of the state is OK
        BSET  ESF_FRAME_UP_N        ;5  not in esf mode any more
        CLR   frame_seek_state ;5  ready to slip bit
        BSET  CLK_INHIBIT      ;5
        BCLR  CLK_INHIBIT      ;5
```

-46-

```
ESF_FRAMING_EXIT:
    RTI

;_____
;
;State machine for ESF framing
;50
;_____ state_machine_sub:
    LDX   frame_seek_state
    BRCLR bit_193,bit_193_0   ;5
bit_193_1:
    LDX   state_variable,X    ;3 load index state_variable
    LSLX                      ;3 multiply reg X by 2
    JMP   switch_table_1,X    ;load switch_table_1
bit_193_0:
    LDX   state_variable,X    ;3 load index state_variable
    LSLX                      ;3 multiply reg X by 2
    JMP   switch_table_0,X    ;4 load switch_table_0 switch_table_0:               ;3 bit 193 = 0
    BRA   state_var_0_0       ;state_variable = 0
    BRA   state_var_0_1       ;state_variable = 1
    BRA   state_var_0_2       ;state_variable = 2
    BRA   state_var_0_3       ;state_variable = 3
    BRA   state_var_0_4       ;state_variable = 4
    BRA   state_var_0_5       ;state_variable = 5
    BRA   state_var_0_6       ;state_variable = 6
    BRA   state_var_0_7       ;state_variable = 7
    BRA   state_var_0_8       ;state_variable = 8
    BRA   state_var_0_9       ;state_variable = 9
    BRA   state_var_0_10      ;state_variable = 10
    BRA   state_var_0_11      ;state_variable = 11
    BRA   state_var_0_12      ;state_variable = 12
    BRA   state_var_0_13      ;state_variable = 13
    BRA   state_var_0_14      ;state_variable = 14
    BRA   state_var_0_15      ;state_variable = 15
    BRA   state_var_0_16      ;state_variable = 16
    BRA   state_var_0_17      ;state_variable = 17
    BRA   state_var_0_18      ;state_variable = 18
    BRA   state_var_0_19      ;state_variable = 19
    BRA   state_var_0_20      ;state_variable = 20
    BRA   state_var_0_21      ;state_variable = 21
    BRA   state_var_0_22      ;state_variable = 22
    BRA   state_var_0_23      ;state_variable = 23
    BRA   state_var_0_24      ;state_variable = 24
    BRA   state_var_0_25      ;state_variable = 25
```

-47-

```
        BRA   state_var_0_26       ;state_variable = 26
        BRA   state_var_0_27       ;state_variable = 27
        BRA   state_var_0_28       ;state_variable = 28
        BRA   state_var_0_29       ;state_variable = 29
        BRA   state_var_0_30       ;state_variable = 30

BRA   state_var_0_19       ;state_variable = 31
        BRA   state_var_0_20       ;state_variable = 32
        BRA   state_var_0_21       ;state_variable = 33
        BRA   state_var_0_22       ;state_variable = 34
        BRA   state_var_0_23       ;state_variable = 35
        BRA   state_var_0_24       ;state_variable = 36

BRA   state_var_0_31       ;state_variable = 37
        BRA   state_var_0_32       ;state_variable = 38
        BRA   state_var_0_33       ;state_variable = 39
        BRA   state_var_0_34       ;state_variable = 40
        BRA   state_var_0_35       ;state_variable = 41
        BRA   state_var_0_36       ;state_variable = 42

;************************************************
;
;The following statements are reflected to the
;state machine for ESF FRAMING and the input
;bit equals 0
;
;************************************************ state_var_0_0:
        LDA   #01d
        BRA   store_state_var_0
state_var_0_1:
        LDA   #03d
        BRA   store_state_var_0
state_var_0_2:
        LDA   #05d                  ;2
        BRA   store_state_var_0
state_var_0_3:
;       LDA   #03d
        BRA   store_state_var_slip_0
state_var_0_4:
        LDA   #05d
        BRA   store_state_var_0
state_var_0_5:
        LDA   #07d
        BRA   store_state_var_0
state_var_0_6:
        LDA   #09d
        BRA   store_state_var_0
```

-48-

```
state_var_0_7:
;       LDA  #03d
        BRA  store_state_var_slip_0
state_var_0_8:
;       LDA  #05d
        BRA  store_state_var_slip_0
state_var_0_9:
        LDA  #12d
        BRA  store_state_var_0
state_var_0_10:
        LDA  #13d
        BRA  store_state_var_0
state_var_0_11:
        LDA  #14d
        BRA  store_state_var_0
state_var_0_12:
;       LDA  #03d
        BRA  store_state_var_slip_0
state_var_0_13:
;       LDA  #07d
        BRA  store_state_var_slip_0
state_var_0_14:
        LDA  #017d
        BRA  store_state_var_0
state_var_0_15:
        LDA  #018d
        BRA  store_state_var_0
state_var_0_16:
;       LDA  #05d
        BRA  store_state_var_slip_0
state_var_0_17:
;       LDA  #03d
        BRA  store_state_var_slip_0
state_var_0_18:
;       LDA  #07d
        BRA  store_state_var_slip_0
state_var_0_19:
state_var_0_20:
state_var_0_22:
state_var_0_25:
state_var_0_26:
state_var_0_28:
state_var_0_31:
state_var_0_32:
state_var_0_34:
        BRA  inc_state_var_0
state_var_0_21:
state_var_0_27:
state_var_0_33:
;       LDA  #03d
        BRA  store_state_var_slip_0
```

-49-

```
        state_var_0_23:
        state_var_0_29:
        state_var_0_35:
        ;   LDA  #07d
 5          BRA  store_state_var_slip_0
        state_var_0_24:
        state_var_0_30:
        state_var_0_36:
        ;   LDA  #05d
10          BRA  store_state_var_slip_0 store_state_var_0:
            LDX  frame_seek_state
            STA  state_variable,X
            RTS 15      store_state_var_slip_0:
            LDA  #invalid_state_value
            slip_bit
            RTS inc_state_var_0:
20          LDX  frame_seek_state
            INC  state_variable,X state_machine_0_EXIT:
            RTS

;************************************************

25      switch_table_1:                 ;bit 193 = 1
            BRA  state_var_1_0          ;state_variable = 0
            BRA  state_var_1_1          ;state_variable = 1
            BRA  state_var_1_2          ;state_variable = 2
            BRA  state_var_1_3          ;state_variable = 3
30          BRA  state_var_1_4          ;state_variable = 4
            BRA  state_var_1_5          ;state_variable = 5
            BRA  state_var_1_6          ;state_variable = 6
            BRA  state_var_1_7          ;state_variable = 7
            BRA  state_var_1_8          ;state_variable = 8
35          BRA  state_var_1_9          ;state_variable = 9
            BRA  state_var_1_10         ;state_variable = 10
            BRA  state_var_1_11         ;state_variable = 11
            BRA  state_var_1_12         ;state_variable = 12
            BRA  state_var_1_13         ;state_variable = 13
40          BRA  state_var_1_14         ;state_variable = 14
            BRA  state_var_1_15         ;state_variable = 15
            BRA  state_var_1_16         ;state_variable = 16
```

```
            BRA     state_var_1_17      ;state_variable = 17
            BRA     state_var_1_18      ;state_variable = 18
            BRA     state_var_1_19      ;state_variable = 19
            BRA     state_var_1_20      ;state_variable = 20
            BRA     state_var_1_21      ;state_variable = 21
            BRA     state_var_1_22      ;state_variable = 22
            BRA     state_var_1_23      ;state_variable = 23
            BRA     state_var_1_24      ;state_variable = 24
            BRA     state_var_1_25      ;state_variable = 25
            BRA     state_var_1_26      ;state_variable = 26
            BRA     state_var_1_27      ;state_variable = 27
            BRA     state_var_1_28      ;state_variable = 28
            BRA     state_var_1_29      ;state_variable = 29
            BRA     state_var_1_30      ;state_variable = 30

BRA     state_var_1_19      ;state_variable = 31
            BRA     state_var_1_20      ;state_variable = 32
            BRA     state_var_1_21      ;state_variable = 33
            BRA     state_var_1_22      ;state_variable = 34
            BRA     state_var_1_23      ;state_variable = 35
            BRA     state_var_1_24      ;state_variable = 36

BRA     state_var_1_31      ;state_variable = 37
            BRA     state_var_1_32      ;state_variable = 38
            BRA     state_var_1_33      ;state_variable = 39
            BRA     state_var_1_34      ;state_variable = 40
            BRA     state_var_1_35      ;state_variable = 41
            BRA     state_var_1_36      ;state_variable = 42

;***********************************************
;
;The following statements are reflected to the
;state machine for ESF FRAMING and the input
;bit equals 1
;
;*********************************************** state_var_1_0:
            LDA     #02d
            BRA     store_state_var_1
        state_var_1_1:
            LDA     #04d
            BRA     store_state_var_1
        state_var_1_2:
            LDA     #06d
            BRA     store_state_var_1
        state_var_1_3:
            LDA     #04d
            BRA     store_state_var_1
        state_var_1_4:
            LDA     #06d
```

```
        BRA  store_state_var_1
state_var_1_5:
        LDA  #08d
        BRA  store_state_var_1
state_var_1_6:
;       LDA  #06d
        BRA  store_state_var_slip_1
state_var_1_7:
        LDA  #10d                    ;2
        BRA  store_state_var_1
state_var_1_8:
        LDA  #011d
        BRA  store_state_var_1
state_var_1_9:
;       LDA  #08d
        BRA  store_state_var_slip_1
state_var_1_10:
;       LDA  #06d
        BRA  store_state_var_slip_1
state_var_1_11:
;       LDA  #06d
        BRA  store_state_var_slip_1
state_var_1_12:
        LDA  #15d
        BRA  store_state_var_1
state_var_1_13:
        LDA  #16d
        BRA  store_state_var_1
state_var_1_14:
;       LDA  #08d
        BRA  store_state_var_slip_1
state_var_1_15:
;       LDA  #06d
        BRA  store_state_var_slip_1
state_var_1_16:
        LDA  #019d
        BRA  store_state_var_1
state_var_1_17:
        LDA  #015d
        BRA  store_state_var_1
state_var_1_18:
        LDA  #16d
        BRA  store_state_var_1 state_var_1_19:
state_var_1_25:
state_var_1_31:
;       LDA  #06d
        BRA  store_state_var_slip_1
state_var_1_20:
state_var_1_26:
```

```
        state_var_1_32:
    ;       LDA  #08d
            BRA  store_state_var_slip_1
        state_var_1_21:
        state_var_1_23:
        state_var_1_24:
        state_var_1_27:
        state_var_1_29:
        state_var_1_30:
        state_var_1_33:
            BRA  inc_state_var_1
        state_var_1_22:
        state_var_1_28:
        state_var_1_34:
    ;       LDA  #06d
            BRA  store_state_var_slip_1
        state_var_1_35:
            good_state
            BRA  inc_state_var_1
        state_var_1_36:
            LDA  #019d
            BRA  store_state_var_1 store_state_var_1:
            LDX  frame_seek_state
            STA  state_variable,X
            RTS store_state_var_slip_1:
            LDA  #invalid_state_value
            slip_bit
            RTS inc_state_var_1:
            LDX  frame_seek_state
            INC  state_variable,X
        state_machine_sub_EXIT:
            RTS ;************************************************************************
;************************************************************************
;************************************************************************

;**********************************************
;ESF ARMING or LOOPDOWN CODE DETECT
;********************************************** import  lpup_value,lpdn_value
            import  DL_BYTE_COUNT
```

-53-

```
        import0  DL_BIT_COUNTER
        import0  esf_debounce_count,ESF_CURRENT_CODE,DL_BYTE_COUNTER
        import   ESF_LOOP_TABLE
        import0  ESF_CURRENT_STATE,ESF_IGNORE_STATE 5   ESF_LOOP_DETECT:
        CLC              ;1st chk what dl bit ='s clear carry bit
        BRCLR   bit_193,DL_00 ;chk level at 0,cport see if =1 or =0
        SEC
    DL_00:
10      ROR     DL_DATA_L
        ROR     DL_DATA_U
        BRSET   HARD_LOOP,EXIT_ESF_LOOP_DET      ;if in manual lpbk,exit
        BRSET   get_esf_lpbk,EXIT_ESF_LOOP_DET   ;if in manual lpbk,exit
        BRCLR   DL_16BITS_FLAG,chk_high_byte     ;JUMP IF BIT COUNTER NOT
15  RUNNING
        DEC     DL_BIT_COUNTER           ;COUNT 16 BIT DL CHUNKS
        TST     DL_BIT_COUNTER
        BNE     EXIT_ESF_LOOP_DET
    chk_high_byte:
20      LDA     DL_DATA_U
        CMP     #ESF_HEADER      ; Start of message (probably 0FFH)
        BEQ     CHK_LOOP_CODE
        BRA     ESF_CODE_STATE_UNKNOWN

EXIT_ESF_LOOP_DET:
25      RTS

;   BRA     EXIT_ESF_LOOP_DET

CHK_LOOP_CODE:
        LDX     DL_DATA_L        ;check esf arming code
        LDX     ESF_LOOP_TABLE,X
30      JMP     esf_jmp_table,X  ;

esf_jmp_table:
        BRA     ESF_CODE_STATE_UNKNOWN    ;ADDR 0
        BRA     ESF_CODE_STATE_UP         ;ADDR 2
        BRA     ESF_CODE_STATE_DN         ;ADDR 4

35  ESF_CODE_STATE_UNKNOWN:                   ;unknown code
        BCLR    DL_16BITS_FLAG
        STX     ESF_CURRENT_CODE
        LDA     #DL_BYTE_COUNT
        STA     DL_BYTE_COUNTER          ;RELOAD DL BYTE COUNTER
40      BRCLR   ignore_esf_code,current_state_unknown
    ;   LDA     #010H
    ;   STA     DL_BIT_COUNTER
        DEC     esf_debounce_count
        TST     esf_debounce_count
```

-54-

```
                BNE       ESF_CODE_STATE_UNKNOWN_EXIT
            BCLR  ignore_esf_code
            RTS
        current_state_unknown:
  5         CLR   ESF_IGNORE_STATE
        ESF_CODE_STATE_UNKNOWN_EXIT:
            RTS ESF_CODE_STATE_UP:
            LDA   #010H
 10         STA   DL_BIT_COUNTER
            BRCLR ignore_esf_code,esf_dec_up_counter
            BRSET ignore_esf_lpup,esf_load_debounce_up      ;jmp if ignore lpup code
        required
            DEC   esf_debounce_count
 15         TST   esf_debounce_count
            BNE   esf_dec_up_counter
            BCLR  ignore_esf_code
            RTS
        esf_load_debounce_up:
 20         LDA #0FFH
            STA  esf_debounce_count
            BRA ESF_CODE_STATE_UP_EXIT esf_dec_up_counter:
            BRCLR  DL_16BITS_FLAG,first_time_valid_code
 25         CPX    ESF_CURRENT_CODE       ;has to see 5 consecutive codes
            BNE    first_time_valid_code  ;has to see 5 consecutive codes
            DEC    DL_BYTE_COUNTER        ;COUNT 10 LOOP CODE BYTE
            TST    DL_BYTE_COUNTER        ;COUNT 10 LOOP CODE BYTE
            BNE    ESF_CODE_STATE_UP_EXIT ;COUNT 10 LOOP CODE BYTE
 30         LDA    #lpup_value      ;rcv esf lpup codes
            STA    ESF_CURRENT_STATE      ;rcv lpup codes
        ;   LDA    #ignore_lpup_value    ;ignore esf lpup codes
            STA    ESF_IGNORE_STATE       ;ignore esf lpup codes
        ESF_CODE_STATE_UP_EXIT:
 35         RTS ESF_CODE_STATE_DN:
            LDA   #010H
            STA   DL_BIT_COUNTER
            BRCLR ignore_esf_code,esf_dec_dn_counter
 40         BRSET ignore_esf_lpdn,esf_load_debounce_dn      ;jmp if ignore lpdn code
        required
            DEC   esf_debounce_count
            TST   esf_debounce_count
            BNE   esf_dec_dn_counter
 45         BCLR  ignore_esf_code
            RTS
        esf_load_debounce_dn:
            LDA #0FFH
```

-55-

```
              STA  esf_debounce_count
              BRA ESF_CODE_STATE_DN_EXIT esf_dec_dn_counter:
              BRCLR DL_16BITS_FLAG,first_time_valid_code
              CPX  ESF_CURRENT_CODE       ;has to see 5 consecutive codes
              BNE  first_time_valid_code  ;has to see 5 consecutive codes
              DEC  DL_BYTE_COUNTER        ;COUNT 10 LOOP CODE BYTE
              TST  DL_BYTE_COUNTER        ;COUNT 10 LOOP CODE BYTE
              BNE  ESF_CODE_STATE_DN_EXIT ;COUNT 10 LOOP CODE BYTE
              LDA  #lpdn_value            ;rcv esf lpdn codes
              STA  ESF_CURRENT_STATE      ;rcv lpdn codes
      ;       LDA  #ignore_lpdn_value     ;ignore esf lpdn codes
              STA  ESF_IGNORE_STATE       ;ignore esf lpdn codes
      ESF_CODE_STATE_DN_EXIT:
              RTS first_time_valid_code:
              BSET DL_16BITS_FLAG         ;wait until the next 2 bytes are ready
              LDA  #DL_BYTE_COUNT         ;RELOAD DL BYTE COUNTER
              STA  DL_BYTE_COUNTER        ;RELOAD DL BYTE COUNTER
              STX  ESF_CURRENT_CODE       ;get original code
              RTS ;***********************************
      ;
      ;Table is used to clear the slip bit
      ;for the current state
      ;
      ;*********************************** clear_slip_bit_table:
              DB 0FFh,0FDh,0FBh,0F7h,0EFh   ;4=1110 1111, 1=1111 1101
                                            ;2=1111 1011, 3=1111 0111

;***********************************
      ;
      ;Table is used to set the slip bit
      ;for the current state
      ;
      ;*********************************** set_slip_bit_table:
              DB 000h,002h,004h,008h,010h ;4=0001 0000, 1=0000 0010
                                          ;2=0000 0100, 3=0000 1000

END
```

INT.S

```
      ;*********************************************************************
      ;        INTERNAL REAL TIME INTERRUPT
      ;*********************************************************************
      ;
 5    INT_TMR:              ;200 uS interrupt
         LDA   OCLR         ;LOW BYTE OUTPUT COMPARE REG.
         ADD   #LOWTIMERVAL ;ADD NEXT TIME TO INTERRUPT
         STA   OCRTEMPLO    ;STORE LOW VAL TEMP. TILL UPPER CALC.
         LDA   OCHR         ;HIGH BYTE
10       ADC   #HIGHTIMERVAL ;TIMER COEFF. HIGH BYTE
         STA   OCHR
         LDA   TSR          ;ACCESS TIMER STATUS REG. CLEARS IT
         LDA   OCRTEMPLO
         STA   OCLR
15       LDA   #55H         ;VALUE FOR WATCHDOG RESET
         STA   COPRR        ;STORE IN COP RESET REGISTER
         LDA   #0AAH        ;VALUE FOR WATCHDOG RESET
         STA   COPRR        ;STORE IN COP RESET REGISTER ;-----------------------------------------------------------------
20    ;THIS SECTION FOR ERROR THRESHOLD USES INPUT CAPTURE ON PIN 41
      ;LABELED AS TCAP
      ;-----------------------------------------------------------------
      IC_INT:
         TST   INT_CNT      ;CHK IF CNT=0 DON'T CHK FOR ERR'S
25       BEQ   IC_S00       ;
         BRCLR 7,TSR,NO_ERROR  ;IF CLR <NO ERRORS> DON'T INCREMENT
      ERROR_CNT
         LDA   ICLR         ;A READ OF THIS REG CLR'S FLAG (INPUT CAPTURE)
         INC   ERROR_CNT    ;UPDATE ERROR_CNT INDICATES ERROR HIT
30    NO_ERROR:
         DEC   INT_CNT      ;INDICATE NUMBER OF REAL TIME INTERRUPTS
      IC_S00:

;-----------------------------------------------------------------
      ;******************** END OF 200uS PART OF INTERRUPT ****************
35    ;-----------------------------------------------------------------
      ;        BEGIN 1 mS PORTION
      ;-----------------------------------------------------------------

TSTTMR1:
         TST   TMR1         ;<------------ this counter reset to 5
40       BEQ   reload_tmr1  ;
         DEC   TMR1         ;
         JMP   INTEND       ;if 5 interrupts have'nt passed then exit ;*********************************************************
      ;The following codes are executed every 1 ms
```

-57-

```
;****************************************************
reload_tmr1:
        LDA     #TMR1_value     ;reset 1 mS counter
        STA     TMR1

TST     MS_COUNTER
        BEQ     test_tmr2
        DEC     MS_COUNTER test_tmr2:
        TST     TMR2            ;test 200ms timer
        BEQ     reload_tmr2     ;
        DEC     TMR2            ;
        JMP     INTEND
;****************************************************
;The following codes are executed every 200 ms
;****************************************************
reload_tmr2
        LDA     #TMR2_value     ;reset 200 mS counter
        STA     TMR2

TST     SCAN_TMR        ;'SCAN_TMR' used in file 'SUB.S' for controlling
        BEQ     TSTTMR3         ; amount of time data direction A or B is looked
        DEC     SCAN_TMR        ; at A/B direction controlled by one port line TSTTMR3:
        TST     TMR3            ;test 30 second timer
        BEQ     reload_tmr3
        DEC     TMR3
        JMP     INTEND ;****************************************************
;The following codes are executed every 30 seconds
;****************************************************
reload_tmr3:
        LDA     #TMR3_value     ;reset 10S counter
        STA     TMR3

BRSET   timeout_flag,INTEND
        TST     TIMEOUT_L       ;See if this counter is zero
        BNE     dec_timeout_1   ;It is, so don't decrement it
        TST     TIMEOUT_H
        BEQ     set_timeout_flag ;timeout
        DEC     TIMEOUT_H
dec_timeout_1:
        DEC     TIMEOUT_L
        JMP     INTEND
set_timeout_flag:
        BSET    timeout_flag
```

```
INTEND:
    RTI    ;<------ EXIT TIMER INTERRUPT

LPBK_TBL.S

;***********************************************************************
5   ;   PURPOSE: This is a table of the possible ESF data link codes
    ;            and if we react to them. 000H has no reaction.
    ;***********************************************************************

UP_0    EQU    02h        ;loop up code converted index value
    DN_0    EQU    04h        ;loop dn code converted index value 10          export  ESF_LOOP_TABLE region "MAIN"

ESF_LOOP_TABLE:

DB 000H,000H,000H,000H,000H,000H,000H,000H ;00-07
            DB 000H,000H,000H,000H,000H,000H,000H,000H ;08-0F
15          DB 000H,000H,UP_0,000H,000H,000H,000H,000H ;10-17  12H
            DB 000H,000H,000H,000H,000H,000H,000H,000H ;18-1F
            DB 000H,000H,000H,000H,DN_0,000H,000H,000H ;20-27  24H
            DB 000H,000H,000H,000H,000H,000H,000H,000H ;28-2F
            DB 000H,000H,000H,000H,000H,000H,000H,000H ;30-37
20          DB 000H,000H,000H,000H,000H,000H,000H,000H ;38-3F
            DB 000H,000H,000H,000H,000H,000H,000H,000H ;40-47
            DB 000H,000H,000H,000H,000H,000H,000H,000H ;48-4F
            DB 000H,000H,000H,000H,000H,000H,000H,000H ;50-57
            DB 000H,000H,000H,000H,000H,000H,000H,000H ;58-5F
25          DB 000H,000H,000H,000H,000H,000H,000H,000H ;60-67
            DB 000H,000H,000H,000H,000H,000H,000H,000H ;68-6F
            DB 000H,000H,000H,000H,000H,000H,000H,000H ;70-77
            DB 000H,000H,000H,000H,000H,000H,000H,000H ;78-7F
            DB 000H,000H,000H,000H,000H,000H,000H,000H ;80-87
30          DB 000H,000H,000H,000H,000H,000H,000H,000H ;88-8F
            DB 000H,000H,000H,000H,000H,000H,000H,000H ;90-97
            DB 000H,000H,000H,000H,000H,000H,000H,000H ;98-9F
            DB 000H,000H,000H,000H,000H,000H,000H,000H ;A0-A7
            DB 000H,000H,000H,000H,000H,000H,000H,000H ;A8-AF
35          DB 000H,000H,000H,000H,000H,000H,000H,000H ;B0-B7
            DB 000H,000H,000H,000H,000H,000H,000H,000H ;B8-BF
            DB 000H,000H,000H,000H,000H,000H,000H,000H ;C0-C7
            DB 000H,000H,000H,000H,000H,000H,000H,000H ;C8-CF
            DB 000H,000H,000H,000H,000H,000H,000H,000H ;D0-D7
40          DB 000H,000H,000H,000H,000H,000H,000H,000H ;D8-DF
            DB 000H,000H,000H,000H,000H,000H,000H,000H ;E0-E7
            DB 000H,000H,000H,000H,000H,000H,000H,000H ;E8-EF
```

```
        DB  000H,000H,000H,000H,000H,000H,000H,000H  ;F0-F7
        DB  000H,000H,000H,000H,000H,000H,000H,000H  ;F8-FF

MAIN_SUB.S
        ;***********************************************************************
  5     ;   This file contains all of the small subroutines which are called
        ;   by the main routines (SCAN,SCAN_QUALIFY,OFFICE_ON,OFFICE_OFF,etc)
        ;***********************************************************************
        SCAN:
             BCLR  $COMP_FLAG           ;INDICATE BAD COMPARE
 10          BRSET HARD_LOOP,SCAN_END   ;if in manual lpbk,do not scan data
             LDA   #INT_CNT_value       ;2 ms delay
             JSR   DELAY_US_WAIT CLR   ERROR_CNT
             LDA   #INT_CNT_value       ;CHK FOR 10 CLEAN INTERRUPTS IN A ROW.
 15          JSR   DELAY_US_WAIT
             LDA   ERROR_CNT
             CMP   #ERROR_CNT_value
             BHI   S2_02
             JMP   ERR_THRES2           ;SINCE PATTERN HAS BEEN DETECTED GO
 20                                     ;TO 5 SEC CHK
        S2_02:
             BCLR  $COMP_FLAG           ;INDICATES PATTERN DET. BAD <NO COMPARE>
             JSR   chk_manual_lpbk
        SCAN_END:
 25       RTS

;_____

EXPORT SCAN_QUALIFY
        SCAN_QUALIFY:

30          BCLR  $COMP_FLAG           ;INDICATE BAD COMPARE
             BRSET HARD_LOOP,SCAN_END   ;if in manual lpbk,do not scan data
             LDA   #INT_CNT_value       ;2 ms delay
             JSR   DELAY_US_WAIT CLR   ERROR_CNT            ;incremented in interrupt every time
 35                                     ;error occurs
             LDA   #INT_CNT_value       ;CHK FOR 10 CLEAN INTERRUPTS IN A ROW.
             JSR   DELAY_US_WAIT
             LDA   ERROR_CNT            ;
             CMP   #ERROR_CNT_value     ;
 40          BHI   S3_02                ;if number of errors detected exceeds
                                        ;4 then no good
             LDA   qualify_time         ;load time for qualify from buffer
```

-60-

```
           BNE  store_scan_time
           BSET $COMP_FLAG            ;INDICATES PATTERN DET. BAD <NO COMPARE>
           RTS store_scan_time:
5          STA  SCAN_TMR
           JMP  ERR_CONT1             ;go to check for qualify
       S3_02:
           BCLR $COMP_FLAG            ;INDICATES PATTERN DET. BAD <NO
       COMPARE>
10         JSR  chk_manual_lpbk
           RTS
       ;----------------------------------------------------------------
       ; MUST MEET ERROR THRESHOLD AND 5 SEC TIME BEFORE ACCEPTING AS CODE
       ;----------------------------------------------------------------
15     ERR_THRES2:
           JSR  SET_TIME_OUT          ;WAIT 5 SEC FOR PATTERN DETECTION TIME
           BRCLR SENDING_ONES,ERR_CONT1   ;If sending all 1s, change
                                      ;detect time to 3 seconds
           JSR  SET_TIME_OUT2
20     ERR_CONT1:
           LDA  #INT_CNT_value_2      ;CHK FOR 10 CLEAN INTERRUPTS IN A ROW.
           STA  INT_CNT
           CLR  ERROR_CNT             ;RESET ERROR COUNTER
       DET_WT3:
25         BRSET HARD_LOOP,SCAN_RET
           BRCLR LP_2SEC_DET,CHECK_5  ;See if we're looking for a
                                      ;loopup address
                                      ;We are, so
           LDA  SCAN_TMR              ;see if address is qualified for 2 seconds
30         CMP  #CNT_DWN_2SEC
           BHI  CHECK_5
           BCLR LP_2SEC_DET           ;Reset the flag, so you don't keep writing
                                      ;to the gate array
           BSET SENDING_ONES          ;Indicate to scan timer we've already
35                                    ;qualified for 2 seconds.
           CLR  ERROR_CNT             ;prevent errors for turning on relay
       CHECK_5:
           TST  SCAN_TMR
           BEQ  DET_EXIT3             ;IF SCAN_TMR TIMES OUT: INDICATES
40                                    ;PATTERN GOOG FOR 5 SEC'S
           TST  INT_CNT               ;IF NOT TIMED OUT CHK IF 10 INTERRUPTS
                                      ;HAVE PASSED
           BNE  DET_WT3
           LDA  ERROR_CNT             ;IF 10 INTERRUPTS HAVE PASSED CHK HOW
45                                    ;MANY ERRS OCCURED
           CMP  #ERROR_CNT_value_2    ;
           BHI  SCAN_EXIT             ;IF MORE THEN 4 THEN BAD NOT GOOD EXIT
           LDA  #INT_CNT_value_2      ;CHK FOR 10 CLEAN INTERRUPTS IN A ROW.
           STA  INT_CNT
50         CLR  ERROR_CNT             ;RESET ERROR COUNTER
```

-61-

```
                JSR  chk_manual_lpbk
                JMP  DET_WT3
        DET_EXIT3:
                BSET $COMP_FLAG            ;EXIT AND INDICATE GOOD COMPARE
5       SCAN_EXIT:
                JSR  chk_manual_lpbk
        SCAN_RET:
                RTS ;***************************************************************
        ;
10      ; lpbk toward office/span side
        ;---------------------------------------------------------------
        OFFICE_ON:
                BSET $LOOP_FLAG_O          ;INDICATE LPBK ACTIVE
                BCLR $LPBK_LED             ;turn on office lpbk led 15              BSET $K2_RELAY             ;ENERGIZE COIL
                LDA  #050D
                JSR  DELAY_WAIT BSET $LIS_RELAY            ;ENERGIZE COIL
                LDA  #060D
20              JSR  DELAY_WAIT BCLR $OFC_TERM             ;ENERGIZE COIL
                LDA  #050D
                JSR  DELAY_WAIT BCLR $CPE_TERM             ;ENERGIZE COIL
25              LDA  #050D
                JSR  DELAY_WAIT LDX  #000D
                BRSET LOS_LPBK_FLAG,NO_LIS ;if doing LOS lpbk don't send LIS
                LDA  #LIS_to_fac_value     ;SEND AIS to CPE
30              BRA  SET_IT
        NO_LIS:
                BCLR span_cutoff           ;turn off output towards CPE
                LDA  #lpbk_no_LIS_value    ;Do lpbk with no AIS towards CPE
        SET_IT:
35              STA  GATE_ARRAY_REG2,X     ;store value in gate array register
                JSR  LOAD_GATE_ARRAY       ;write registers to gate array
                LDA  #02D
                JSR  DELAY_WAIT
                LDA  #main_normal_state_value
40              STA  main_current_state
                RTS ;---------------------------------------------------------------
        ;---------------------------------------------------------------
```

```
OFFICE_OFF:
        BCLR  $LOOP_FLAG_O      ;indicate LPBK inactive
        BSET  $LPBK_LED         ;turn off office lpbk led BCLR  $K2_RELAY         ;ENERGIZE COIL
5       LDA   #050D
        JSR   DELAY_WAIT BCLR  $LIS_RELAY        ;ENERGIZE COIL
        LDA   #050D
        JSR   DELAY_WAIT 10      BSET  $OFC_TERM         ;ENERGIZE COIL
        LDA   #050D
        JSR   DELAY_WAIT BSET  $CPE_TERM         ;ENERGIZE COIL
        LDA   #050D
15      JSR   DELAY_WAIT LDA   #main_normal_state_value
        STA   main_current_state BSET  span_cutoff       ;turn on output towards CPE
        RTS 20  ;------------------------------------------------------------
    ;   MSECONDS DELAY ROTUINE
    ;   USE MS_COUNTER
    ;------------------------------------------------------------
    DELAY_WAIT:
25      STA   MS_COUNTER        ;STORE VALUE INTO MS TIMER
    DELAY_LOOP:
        TST   MS_COUNTER        ;WAIT FOR TIMER TO DECREMENT TO ZERO
        BNE   DELAY_LOOP
        RTS                     ;EXIT DELAY 30  ;------------------------------------------------------------
    ;
    ;   INT_CNTx200 micro seconds dealy
    ;
    ;
35  ;_____

DELAY_US_WAIT:
        STA   INT_CNT
    DELAY_US_LOOP:
        TST   INT_CNT           ;WAIT FOR TIMER TO DECREMENT TO ZERO
40      BNE   DELAY_US_LOOP
        RTS                     ;EXIT DELAY
```

-63-

```
;----------------------------------------------------------------
;DELAY LOOP USED BEFORE INTERRUPT IS TURNED ON
;----------------------------------------------------------------
DELAY_2:
      LDA  #05AH
      LDX  #0FFH
D_2_LOOP:
      DEX
      BNE  D_2_LOOP
      DECA
      BEQ  D_2_EXIT
      LDX  #0FFH
      JMP  D_2_LOOP
D_2_EXIT:
      RTS
;----------------------------------------------------------------
SET_SCAN_TIME:                    ;SET SCAN TIME TO 10 SEC'S
      LDA  #050D
      STA  SCAN_TMR
      RTS
;----------------------------------------------------------------
SET_SCAN_TIME2:                   ;SET SCAN TIME TO 40 SEC'S
      LDA  #0200D
      STA  SCAN_TMR
      RTS
;----------------------------------------------------------------
SET_TIME_OUT:                     ;SET SCAN TIME TO 5 SEC'S
      LDA  #025D
      STA  SCAN_TMR
      RTS
;----------------------------------------------------------------
SET_TIME_OUT2:                    ;SET SCAN TIME TO 3 SEC'S
      LDA  #015D
      STA  SCAN_TMR
      RTS
;----------------------------------------------------------------
SET_LOOP_TIMEOUT:
      LDA  #LOOP_TO_TIME_H         ;?? mins timeout
      STA  TIMEOUT_H
      LDA  #LOOP_TO_TIME_L
      STA  TIMEOUT_L
      BCLR timeout_flag            ;enable loop timeout
      BCLR timeout_disable         ;enable loop timeout
      BCLR rcv_tmout_disable       ;enable loop timeout
      RTS ;----------------------------------------------------------------
;****************************************************************
;****************************************************************
;****************************************************************
;
```

```
        DET_ARM_CODE:
            LDA  #ARM_CODE       ;PUT IN PATTERN FOR ARMING CODE
            STA  DET_PATTERN     ;PRE LOAD DET_PATTERN VALUE
            LDA  #ARM_CODE_2     ;PUT IN PATTERN FOR ARMING CODE
5           STA  DET_PATTERN_2   ;PRE LOAD DET_PATTERN VALUE
            JSR  RCV_DETECT      ;MODIFY GATE_ARRAY_REG
            RTS

DET_LPDWN_CODE:
            LDA  #LP_DWN_CODE    ;LOOP DWN CODE
10          STA  DET_PATTERN     ;PRE LOAD DET_PATTERN VALUE
            LDA  #LP_DWN_CODE_2  ;LOOP DWN CODE
            STA  DET_PATTERN_2   ;PRE LOAD DET_PATTERN VALUE
            JSR  RCV_DETECT      ;MODIFY GATE_ARRAY_REG
            RTS

15      ;**********************************
        ; loss of signal
        ;**********************************

DET_LOS_CODE:
            LDA  #LOS_CODE       ;PUT IN PATTERN FOR LOS CODE
20          STA  DET_PATTERN     ;PRE LOAD DET_PATTERN VALUE
            LDA  #LOS_CODE_2     ;PUT IN PATTERN FOR LOS CODE
            STA  DET_PATTERN_2   ;PRE LOAD DET_PATTERN VALUE
            JSR  RCV_DETECT      ;MODIFY GATE_ARRAY_REG
            RTS

25      ;-----------------------------------------------------------------

;-----------------------------------------------------------------
            export LOOP_DWN LOOP_DWN:
30          JSR  OFFICE_OFF      ;TURN OFF ALL LOOP BACKS
            JSR  chk_los_AIS
            JSR  LOAD_GATE_ARRAY
            LDA  #10D
            JSR  DELAY_WAIT
35          BCLR HARD_LOOP_0     ;turn manual lpbk flag off
            RTS
        ;*********************************************************************
        ;*********************************************************************
        ;*********************************************************************
40      ;-----------------------------------------------------------------
        ;This section loads the pattern to be detected into registers to sent to the
        ;gate array
        ;-----------------------------------------------------------------
        ;-----------------------------------------------------------------
45      RCV_DETECT:
```

```
        LDA  DET_PATTERN
        LDX  #001D
        STA  GATE_ARRAY_REG2,X   ;BYTE 1 IN RAM MAP GATE ARRAY DESIGN
        LDA  DET_PATTERN_2
        LDX  #002D
        STA  GATE_ARRAY_REG2,X   ;BYTE 2 IN RAM MAP GATE ARRAY DESIGN
        JSR  LOAD_GATE_ARRAY
        RTS

;*****************************************
;
;*****************************************

LOAD_GATE_ARRAY:           ;load shift line is low for xilinx to load,
        LDA  #03D          ;wait 600us for xilinx to get ready
        JSR  DELAY_US_WAIT
        CLR  SHFT_CNT      ;high when not loading data to gate array
                           ;this is necessary for xilinx to process tl
                           ;data properly
        BCLR $LD_SHIFT     ;low to chip select
LOAD570X:
SHFT_LOOP2:
        LDX  SHFT_CNT        ;
        LDA  xmt_xilinx_buffer,X  ;load config data for gate array design
        JSR  SND_DATA_8      ;go and shift bits out
        INC  SHFT_CNT        ;
        LDA  SHFT_CNT        ;
        CMP  #004D           ;map is 8 bits by 4 reg's (4 control reg)
        BNE  SHFT_LOOP2      ;chk if last reg. data has been shipped
SHFT_EXIT:
        BSET $LD_SHIFT
        RTS
;***********************************************************
;***********************************************************
;***********************************************************
SND_DATA:                  ;clk out 0 or 1 on serial port
        BCC  SND_ZERO
        BSET $SER_DATA
        BSET $SER_CLK
        BCLR $SER_CLK
        RTS
SND_ZERO:
        BCLR $SER_DATA
        BSET $SER_CLK
        BCLR $SER_CLK
        RTS
;-----------------------------------------------------------
;-----------------------------------------------------------
;-----------------------------------------------------------
SND_DATA_8:                ;send 8 bits out serial port
        LDX  #008D
```

-66-

```
      SD8_LP:
          LSLA
          JSR  SND_DATA        ;PULSE DATA TO G.A.
          DEX
5         BNE  SD8_LP
          RTS

OFFICFAC.S

;**********************************************************************
      ;    PURPOSE: These routines check for loopup or loopdown codes including
10    ;             the flags set by the ESF Data Link checker
      ;**********************************************************************

;----------------------------------------------------------------
      ;   Check status of a switch
      ;----------------------------------------------------------------
15    chk_nonmon_debounce:    #macro
          BRSET $1,$2,chk_SW_LOW$$           ;jmp if SW is disable(active low)
          BRSET $3,$4,chk_nonmon_debounce_EXIT$$ ;jmp with no change in SW and it is enable
          BRA  chk_SW_debounce$$
      chk_SW_LOW$$:                          ;SW is deactive
20        BRCLR $3,$4,chk_nonmon_debounce_EXIT$$ ;jmp with no change in SW and it is disable
      chk_SW_debounce$$:
          chk_debounce $5,$1,$2              ;switch changed,50 ms debounce checking
          BSET $3,$4                         ;switch is qualified to be active
          BRA  chk_nonmon_debounce_EXIT$$
25    $5:                                    ;SW is disable  after checking
          BCLR $3,$4                         ;switch is qualified to be deactive
      chk_nonmon_debounce_EXIT$$:
          #endm ;*************************************
30    ;
      ;check loopdown code
      ;
      ;************************************* export check_loopdown_code 35    check_loopdown_code:
                      ;chk_nonmon_debounce
          INBAND_AUTO_SW,INBAND_AUTO_FLAG,NOT_AUTO
          BCLR COMP_FLAG
          BCLR LP_2SEC_DET 40        BRSET ESF_LED,chk_inband_lpdn
          BRCLR get_esf_lpbk,chk_ia_flag     ;Check if ESF loopdown has
          BRSET $ESF_DWN_DET,esf_DWN_CODE_DET ;been detected
```

-67-

```
chk_ia_flag:
     BRCLR INBAND_AUTO_FLAG,chk_loopdown_exit   ;IN AUTO MODE, GET OUT
chk_inband_lpdn:
     LDA  #TIME_1SEC            ;set scan time to 1 second
 5   STA  qualify_time
     BCLR $DATA_SEL             ;Force repeater to the DSX side
     JSR  DET_LPDWN_CODE        ;Look for the usual loopdown codes
     JSR  SCAN_QUALIFY
     BRCLR $COMP_FLAG,clr_loopdown_flag    ;CHECK IF 1ST COMP IS MADE
10   BCLR COMP_FLAG             ;we see loopdown code
     BRSET ESF_LED,check_1
     BRCLR INBAND_AUTO_FLAG,chk_loopdown_exit  ;IN AUTO MODE, GET OUT
check_1:
     BRSET sf_rcv_lpdwn,chk_loopdown_exit   ;jmp if still rcv previous codes
15   LDA  #TIME_4SEC            ;set scan time to 4 seconds
     STA  qualify_time
     JSR  SCAN_QUALIFY
     BRCLR $COMP_FLAG,clr_loopdown_flag    ;CHECK IF 1ST COMP IS MADE
     CLR  SF_CURRENT_STATE      ;clr rcv flags for other codes
20   BSET sf_rcv_lpdwn          ;rcv loopdown code
     BRA  chk_loopdown_exit
clr_loopdown_flag:
     BCLR sf_rcv_lpdwn          ;not rcv loopdown code any more
     BRA  chk_loopdown_exit
25 clr_main_rcv_state_lpdwn:
     CLR  SF_CURRENT_STATE      ;clr rcv flags for other codes
     BRA  chk_loopdown_exit
esf_DWN_CODE_DET:
     BSET COMP_FLAG             ;we see loopdown code
30   CLR  ESF_CURRENT_STATE     ;start running esf lpbk det routine
chk_loopdown_exit:
     RTS ;****************************************************************
;
;
35 ;chk arming code(actually this is checking for loopup code)
;
;**************************************************************** chk_arming:
     chk_nonmon_debounce  INBAND_AUTO_SW,INBAND_AUTO_FLAG,NOT_AUTO
40   BCLR COMP_FLAG
     BCLR LP_2SEC_DET BRSET ESF_LED,chk_inband_lpup
     BRCLR get_esf_lpbk,chk_ia_flag1
     BRSET $ESF_ARM_DET,esf_UP_CODE_DET    ;check if ESFDL lpup occured
45 chk_ia_flag1:
     BRCLR INBAND_AUTO_FLAG,chk_arming_EXIT   ;IN AUTO MODE, GET OUT
```

-68-

```
chk_inband_lpup:
        LDA  #TIME_1SEC          ;set scan time to 1 second
        STA  qualify_time
        BCLR DATA_SEL            ;set to office side
5       JSR  DET_ARM_CODE        ;GO SET UP GATE ARRAY
        JSR  SCAN_QUALIFY        ;CHK IF PATTERN IS BEING RECEIVED
        BRCLR $COMP_FLAG,clr_arming_flag  ;IF COMP FLAG IS HIGH THEN PTRN
    DETECTED
        BCLR COMP_FLAG           ;clr COMP flag
10      BRSET ESF_LED,check_2    ;branch if not detecting ESF
        BRCLR INBAND_AUTO_FLAG,chk_arming_EXIT ;IN AUTO MODE, GET OUT
    check_2:
        BRSET sf_rcv_arming,chk_arming_EXIT
        LDA  #TIME_4SEC          ;set scan time to 4 seconds
15      STA  qualify_time
        JSR  SCAN_QUALIFY        ;CHK IF PATTERN IS BEING RECEIVED
        BRCLR $COMP_FLAG,clr_arming_flag  ;IF COMP LINE IS HIGH THEN PATT.
    DETECTED
        CLR  SF_CURRENT_STATE    ;clr rcv flags for other codes
20      BSET sf_rcv_arming       ;rcv arming code
        BRA  chk_arming_EXIT
    clr_main_rcv_state_arming:
        CLR  SF_CURRENT_STATE    ;clr rcv flags for other codes
        BRA  chk_arming_EXIT 25  clr_arming_flag:
        BCLR sf_rcv_arming       ;clr rcv flags for other codes
        BRA  chk_arming_EXIT esf_UP_CODE_DET:
        BSET COMP_FLAG           ;we see loopup code
30      CLR  ESF_CURRENT_STATE   ;start running esf lpbk det rountine
    chk_arming_EXIT:
        RTS

SETUP.S

;************************************************************
35  ;*        CONFIGURE I/O PORTS & TIMER                       *
    ;************************************************************

START:                       ;'START' reset vector
        SEI                      ;disable interrupts
    ;--------------------------------------------------------------
40  START1:
        LDA  #0BFH               ; set data direction reg.'s
        STA  ADDR                ;
        LDA  #0FFH               ; 1 = output
        STA  BDDR                ;
```

-69-

```
          LDA  #11101011B  ; 0 = input - will change later
          STA  CDDR        ;
    ;-----------------------------------------------------------
          LDA  #00011110B  ;SET INTIAL VALUES OF PORTS,power led on
5         STA  APORT       ;
          LDA  #00111100B  ;
          STA  BPORT       ;
          LDA  #11011111B  ;
          STA  CPORT       ;

10        BCLR POWER_LED   ;turn on power led

;-----------------------------------------------------------
          LDA  #0C0H       ;set RAM0 and RAM1 bit gives extra data memory
          STA  OPTION      ;
    ;-----------------------------------------------------------
15        BSET $CCLK
    ;-----------------------------------------------------------
          LDA  #TCR_MASK   ;SET UP TIMER CONTROL REG.
          STA  TCR
    ;-----------------------------------------------------------
20  CLEAR_RAM:
          LDA  #00H
          LDX  #00H
    RAM_LOOP:
          STA  RAM_START,X
25        INX
          CPX  #RAM_END
          BEQ  RAM_DONE
          JMP  RAM_LOOP
    RAM_DONE:
30        JSR  DELAY_2
          JSR  DELAY_2
          JSR  DELAY_2
          JSR  DELAY_2
          JSR  DELAY_2

35  ;-----------------------------------------------------------
    SET_RELAYS:
    ;-----------------------------------------------------------

CLI              ;turn interrupts loose
          JSR  OFFICE_OFF  ;turn off loopback relays(note: need timer to control relays)
40        SEI              ;turn off interrupts LOOP_SKIP:
    ;-----------------------------------------------------------
    ; INTIALIZE COUNTERS AFTER RAM CLEAR
    ;-----------------------------------------------------------
45        LDA  #NONERR_THRES
```

-70-

```
            STA  NONERR_CNT
;-----------------------------------------------------------------
            BSET $X_RESET            ;set reset pin on gate array
            JSR  DELAY_2
5           JSR  DELAY_2
            JSR  DELAY_2
            JSR  DELAY_2
            LDA  #0FEH
            STA  xmt_xilinx_buffer   ;set control register to default
10  ;-----------------------------------------------------------------
            BCLR $SER_CLK

BCLR 0,CDDR

BCLR POWER_LED           ;turn on power led

CLR  frame_seek_state    ;initialize esf framing routine
15          CLR  state_variable      ;initialize esf framing routine
            LDA  #main_normal_state_value   ;go to normal state
            STA  main_current_state  ;go to normal state
            CLR  SF_CURRENT_STATE    ;initialize rcv states for all codes
            LDA  #DL_BYTE_COUNT      ;RELOAD ESF LOOPCODE DETECT
20          STA  DL_BYTE_COUNTER     ;RELOAD ESF LOOPCODE DETECT
            CLR  ESF_CURRENT_STATE   ;SET TO STATE 0
            CLR  ESF_IGNORE_STATE    ;reset esf ignore state CLI
            LDA  #030H
25          STA  SCBRR   ;CONFIGURE BAUD RATE - 9600 BUAD (3800Hz) w/4MHz xtal
            LDA  #000H
            STA  SCCR1   ;CONFIGURE SCI CONTROL REG1
        ;   LDA  #02CH
            STA  SCCR2   ;CONFIGURE SCI CONTROL REG2
30          LDA  SCSR
            LDA  SCDR
;-----------------------------------------------------------------
            LDA  #00001110B   ;SET COP FOR 16.54 MS TIME OUT
            STA  COPCR
35          LDA  #055H
            STA  COPRR
            LDA  #0AAH
            STA  COPRR
            BCLR POWER_LED           ;turn on power led
40          BCLR LOS_SPAN_FLAG       ;initialize to no los for span(CPE)
            BCLR LOS_DSX_FLAG        ;initialize to no los for dsx
;-----------------------------------------------------------------
            JMP  MAIN   ;<< GO TO MAIN BODY >>
;-----------------------------------------------------------------
```

-71-

A preferred embodiment of the present invention has been described herein. It is to be understood, of course, that changes and modifications may be made in the embodiments shown without departing from the true scope and spirit of the present invention, as defined by the appended claims.

We claim:

1. A network interface unit for interconnecting incoming and outgoing telephone lines with incoming and outgoing customer premises lines comprising, in combination:

a single, planar circuit board assembly, interconnected to said telephone lines and customer premises lines;

a first relay interconnected to both said incoming telephone and customer lines and mounted on said board;

a second relay interconnected to said outgoing customer and telephone lines and mounted on said board; and a controller, mounted on said board and having both an application specific integrated circuit and a processor, for monitoring data along said lines, recognizing a loopback signal, and responsively activating said relays to interconnect said incoming and outgoing telephone lines, said controller further providing a data signal along said lines.

2. A network interface unit as claimed in claim 1 wherein said controller further detects a loss of signal along said lines and responsively issues said data signal along said lines and wherein said data signal comprises an alarm indication signal.

3. A network interface unit as claimed in claim 1 wherein said controller further provides said data signal along said lines by providing said data to one of said relays.

4. A network interface unit as claimed in claim 3 wherein said controller further includes a signal generator for providing said data signal to said one of said relays.

5. A network interface unit as claimed in claim 1 wherein said controller further includes recognition circuitry for detecting a pattern within data on said lines and responsively providing said data signal along said lines.

6. A network interface unit as claimed in claim 1 wherein said controller further includes frame circuitry for recognizing frames of data on said incoming telephone line.

7. A network interface unit for interconnecting incoming and outgoing telephone lines with incoming and outgoing customer premises lines comprising, in combination:

a single, planar circuit board assembly, interconnected to said telephone lines and customer premises lines;

a first relay interconnected to both said incoming telephone and customer lines and mounted on said board;

a second relay interconnected to said outgoing customer and telephone lines and mounted on said board; and a controller, mounted on said board and having both an application-specific integrated circuit and a processor, for monitoring data along said lines, recognizing a loopback signal and responsively activating said relays to interconnect said incoming and outgoing telephone lines, said controller further including a convertor for converting bipolar signals on said incoming telephone line to unipolar signals and providing a data signal along said lines.

8. A network interface unit for interconnecting incoming and outgoing telephone lines with incoming and outgoing customer premises lines comprising, in combination:

a single, planar circuit board, interconnected to said telephone lines and to said customer premises lines;

a first relay interconnected to both said incoming telephone and customer premises lines, said first relay mounted on said planar circuit board;

a second relay interconnected to said outgoing customer and telephone lines, said second relay mounted on said planar circuit board; and a controller mounted on said planar circuit board, said controller including both an application specific integrated circuit and a processor, said controller monitoring data along said lines, recognizing a loopback signal, and responsively activating said relays to interconnect said incoming and outgoing telephone lines, said controller further providing a data signal along said lines, and said application specific integrated circuit including (i) bipolar to unipolar data conversion circuitry, (ii) framer circuitry, (iii) pattern recognition circuitry and (iv) data signal generation circuitry.

* * * * *